US006944866B1

(12) United States Patent
MacPhail

(10) Patent No.: US 6,944,866 B1
(45) Date of Patent: Sep. 13, 2005

(54) SYSTEM AND METHOD FOR COORDINATING OPERATOR EFFORTS USING ACTION DIARIES

(75) Inventor: Margaret Gardner MacPhail, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 641 days.

(21) Appl. No.: 09/714,251

(22) Filed: Nov. 16, 2000

(51) Int. Cl.[7] .................................................. G06F 9/46
(52) U.S. Cl. ........................ 719/318; 709/204; 709/223
(58) Field of Search .......................... 719/318; 709/204, 709/223–225, 205

(56) References Cited

U.S. PATENT DOCUMENTS

| | | | | |
|---|---|---|---|---|
| 5,182,705 A | | 1/1993 | Barr et al. | 705/11 |
| 5,323,519 A | | 6/1994 | Cloud | 705/9 |
| 5,333,302 A | | 7/1994 | Hensley et al. | 714/37 |
| 5,430,875 A | | 7/1995 | Ma | 709/318 |
| 5,655,081 A | | 8/1997 | Bonnell et al. | 709/202 |
| 5,666,481 A | | 9/1997 | Lewis | 714/4 |
| 5,742,848 A | | 4/1998 | Burgess | 709/315 |
| 5,893,077 A | | 4/1999 | Griffin | 705/34 |
| 5,961,610 A | | 10/1999 | Kelly et al. | 709/318 |
| 6,012,152 A | * | 1/2000 | Douik et al. | 714/26 |
| 6,055,574 A | * | 4/2000 | Smorodinsky et al. | 709/226 |
| 6,119,147 A | * | 9/2000 | Toomey et al. | 709/204 |
| 6,131,166 A | | 10/2000 | Wong-Insley | 713/300 |
| 6,144,967 A | | 11/2000 | Nock | 707/103 R |
| 6,268,852 B1 | | 7/2001 | Lindhorst et al. | 345/744 |
| 6,304,861 B1 | * | 10/2001 | Ferguson | 706/10 |
| 6,349,333 B1 | | 2/2002 | Panikatt et al. | 709/223 |
| 6,363,411 B1 | | 3/2002 | Dugan et al. | 709/202 |
| 6,370,563 B2 | * | 4/2002 | Murakami et al. | 709/205 |
| 6,470,384 B1 | | 10/2002 | O'Brien et al. | 709/223 |
| 6,542,932 B1 | | 4/2003 | Brinnand et al. | 709/229 |
| 6,633,782 B1 | | 10/2003 | Schleiss et al. | 700/26 |
| 6,640,241 B1 | * | 10/2003 | Ozzie et al. | 709/204 |
| 2003/0023473 A1 | | 1/2003 | Guyan | 705/9 |

* cited by examiner

*Primary Examiner*—Meng-Al T. An
*Assistant Examiner*—Phuong N. Hoang
(74) *Attorney, Agent, or Firm*—Van Leeuwen & Van Leeuwen; Joseph T. Van Leeuwen; Jeffrey S. LaBaw

(57) ABSTRACT

A system and method for allowing system operators to collaborate and coordinates efforts through an action diary. The operators communicate directly with each other through a chat page in the appropriate action diaries. The dialog may be saved for archive, copy commentary to action diary notes, or deleted. Two or more operators may work on solving the same root problem. Coordinating operator efforts includes capturing the coordinated best practice solution. Two operators working on the same root problem may access two different action diaries or a common action diary. Pre-set event rules cause both operators to be notified of the other operator's actions. The updates to both action diaries are coordinated as appropriate. Each diary may reference the other's path allowing individual customization. In other cases, the paths may be duplicated.

41 Claims, 17 Drawing Sheets

SYSTEM AND METHOD FOR COORDINATING OPERATOR EFFORTS USING ACTION DIARIES

RELATED APPLICATIONS

This application is related to the following co-pending U.S. patent application filed on the same day as the present application and having the same inventor and assignee: "System and Method For Associating Action Diaries with a Parent Class Object," Ser. No. 09/714,248 (Notice of Allowance Received).

BACKGROUND

1. Field of the Invention

The present invention relates to information processing technology. More particularly, the present invention relates to a system and method for system operators to collaborate and the coordination of their efforts using an action diary.

2. Description of the Related Art

One of the highest priorities of information technology (IT) organizations responsible with managing mission-critical computing environments is to ensure that problems, as well as conditions that could lead to problems, are handled in a timely and efficient manner. Events may come from a variety of sources. Examples include events that occur: (1) when a link to another computer system goes down, (2) when a router used for routing information goes down, (3) when a database is down, (4) when the system processor is maximized, or "pegged," for an extended period, (5) when a disk is full, (6) when one or more applications that make up a critical business function (i.e., order entry) go down, (7) when a critical application program's performance degrades beyond an acceptable level, and (8) when a host computer is going down.

As used herein, a "business system" serves the needs of the organization's critical functions, such as order entry, marketing, accounts receivable, and the like. A business system may span several dissimilar types of computers and be distributed throughout many geographical locations. A business system, in turn, is typically based upon several application programs. An application program may also span several dissimilar types of computers and be distributed throughout a network of computer systems.

An application typically serves a particular function that is needed by the business system. An individual application program may, or may be, be critical to the business system depending upon the role the application program plays within the overall business system. Using networked computers, an application may span several computer systems. In an Internet commerce system, for example, an application program that is part of the company's order processing business system, may be responsible for serving web pages to users browsing the companies online catalog. This application may use several computer systems in various locations to better serve the customers and provide faster response to customer inquiries.

The application may use some computers running one type of operating system, for example a UNIX-based operating system such as IBM's AIX® operating system, while other computer systems may run another type of server operating system such as Microsoft's Windows NT® Server operating system. Individual computer systems work together to provide the processing power needed to run the business systems and application programs. These computer systems may be mainframes, mid-range systems, workstations, personal computers, or any other type of computer that includes at least one processor and can be programmed to provide processing power to the business systems and applications.

Computer systems, in turn, include individual resources that provide various functionality to the computer systems. For example, a modem is an individual resource that allows a computer system to link to another computer system through an communication network. A router is another individual resource that routes electronic messages between computer systems. Indeed, even an operating system is an individual resource to the computer system providing instructions to the computer system's one or more processors and facilitating communication between the various other individual resources that make up the computer system. Events, as described herein, may effect an entire business system, an application program, a computer system, or an individual resource depending upon the type of event that occurs.

The number and types of events that may occur vary widely from system to system based upon the system characteristics, load, and desired use of the system. A business system providing content from an Internet site may experience different events than a business system used to process a the company's payroll. However, many events between dissimilar systems overlap. For example, many computer systems experience problems when the disk space is full and many computer systems experience problems when the system's processor is pegged. The types of problems these events cause, however, will vary depending upon the types of work that the business system is expected to perform.

In the Internet site example, a pegged processor is likely to result in applications interfacing with Internet users to become stalled or unusable and transaction throughput to stall or become exceedingly slow. In the corporate payroll system, the same pegged processor may result in critical software applications that make up the payroll application stalling or becoming exceedingly slow. The causes of the pegged processor may also be different depending upon the usage of the computer. An Internet server's processor may become pegged due to receiving more requests from Internet users than can be handled. The corporate payroll system's processor may have become pegged due to multiple processor-intensive business applications running simultaneously on the system.

Computers are often linked to one another using a network, such as a local area network (LAN), wide area network (WAN), or other types of networks such as the Internet. By linking computers, one computer can use resources owned by another computer system. These resources can include files stored on nonvolatile storage devices and resources such as printers. Smaller computers used by an individual (client computers) are often linked to more powerful computers, called servers, that provide large file systems, larger processing capabilities, and resources not typically found on client computers. Servers may be larger PCs, workstations, or mainframe computer systems.

As computer technology continues to proliferate in society and organizations in particular, computer systems and networks likewise increase in complexity. Computing power in an organization is often distributed with servers residing in multiple locations. Operators utilize diagnostic tools and other system tools to remotely learn of conditions occurring in remote systems and to remotely correct those conditions using their available knowledge and resources. Operators may also be distributed with some operators residing at one location while other reside at a different location. In addition, operators in smaller organizations may be "on call" during weekends and non-business hours. In these environments, an operator may receive a page or call at home regarding a system problem. Using networking technology, the operator preferably logs on to the computer system from a PC at his or her home and resolves the problem from home rather than taking the additional time to travel to the office to handle the problem.

When handling a problem, system operators use various methods to record system problems and the corresponding solutions to those problems. One method used is to keep a computer or paper based system log. The operator writes or types the situations that occur on the computer system, what was done to correct the situation, and the result or outcome of their efforts. When a condition is discovered in the computer system, the operators review their logs for notes concerning any previous occurrences of the condition. If a previous entry is found, the operators use the recorded solution in order to attempt to resolve the condition.

Challenges with paper based logs are that they are maintained in one location. As discussed above, operators are often distributed from both each other and from the systems that they maintain. An operator that receives a call at home is unable to access a paper based log unless a copy is maintained at him home. Operators that are remote from one another are unable to view each other's notes without faxing or otherwise transmitting the paper based information.

Another challenge with computer based logs is that they often have difficulty accurately capturing all of the data relating to the problem. Operators often rely upon memory to reconstruct the problem that was encountered and solved. Relying upon memory introduces errors as certain details may be forgotten or inaccurately transcribed. In addition, while a computer based log is typically easier to access remotely, many manual steps must still be employed to capture the data and launch corrective actions. In addition, operators are often too busy to maintain the logs effectively. Outdated solutions may remain in the log causing confusion amongst newer operators that do not know that conditions have changed. Furthermore, if multiple operators are working on the same problem multiple updates to the log may occur causing further problems to the computer based log. One of the greatest challenges is tying log notes to the event, tying the event to the problem, and tying the solution to the problem. Another related challenge is capturing solution practices and identifying when a practice is outdated, solid, or when a practice is the best practice but not solid.

What is needed, therefore, is a system and method to assist operators in addressing system conditions and problems using an object based action diary.

SUMMARY

It has been discovered that an action diary can improve handling of system events, tasks and operator observations. An action diary includes best practice information that is updated by the system and by the operator as appropriate. Operators use the information stored in the action diary to handle system events and tasks. In addition, responses to events and tasks can be automated so that an automated response occurs when a certain event or task is detected. As knowledge of a computer system improves over time, the knowledge is captured in the action diary. In this manner, the action diary corresponds to the lifecycle of best practices of handling events and tasks. New or different events and tasks are more readily understood and handled by using prior knowledge contained in the action diary. As knowledge of a particular task or situation improves the corresponding action diary information also improves. General increasingly particularized action diaries that correspond to a more particular problem, event, or task.

It has further been discovered that action diary objects include system and methods for managing action diary objects based on actions, events, and tasks through a lifecycle. A system administrator can setup the system to generate a specific action diary instance and associate it with another object instance. The operator can update the action diary to indicate comments and actions taken in handling an event. Periodically, the system administrator may review the action diaries and edit them for best current practices. A method is provided for creating and maintaining an action diary such that multiple data object types can become part of the action diary and can be organized and maintained as appropriate throughout the lifecycle of the best practice. The user can create an action diary to be associated with a specific type of object or class of objects so that when the indicated object is created, the action diary is available to the operator who will be handling the object. The operator may create a new action diary and associate it with another, already existing object. The new action diary will be created with system policy pre-set defaults which may include automatically creating certain documentation fields such as timestamp, creator, and associated object link and may place these fields in policy pre-determined locations. The operator can select from a palette of objects such as a text box or action and place the object into the action diary first page. The action object may require additional input from the operator to run such as adding specific command parameters. The operator can place objects within the action diary as appropriate for describing the actions taken to handle the situation. In early stages of best practice discovery, operators may try new actions or a series of actions. An action-capture object captures the actions performed by the operator and associates the captured actions with an action diary which is associated with a particular object or class of object. The operator opens an existing action diary or creates a new action diary. An action-capture object captures the operator input until it is turned off. Parameters associated with captured actions are also associated with the action and stored with the action diary. As action diary objects progress through a lifecycle, highlighting (such as shading) of visual representations of action diary approaches indicate the maturity stage of a particular approach within the lifecycle.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
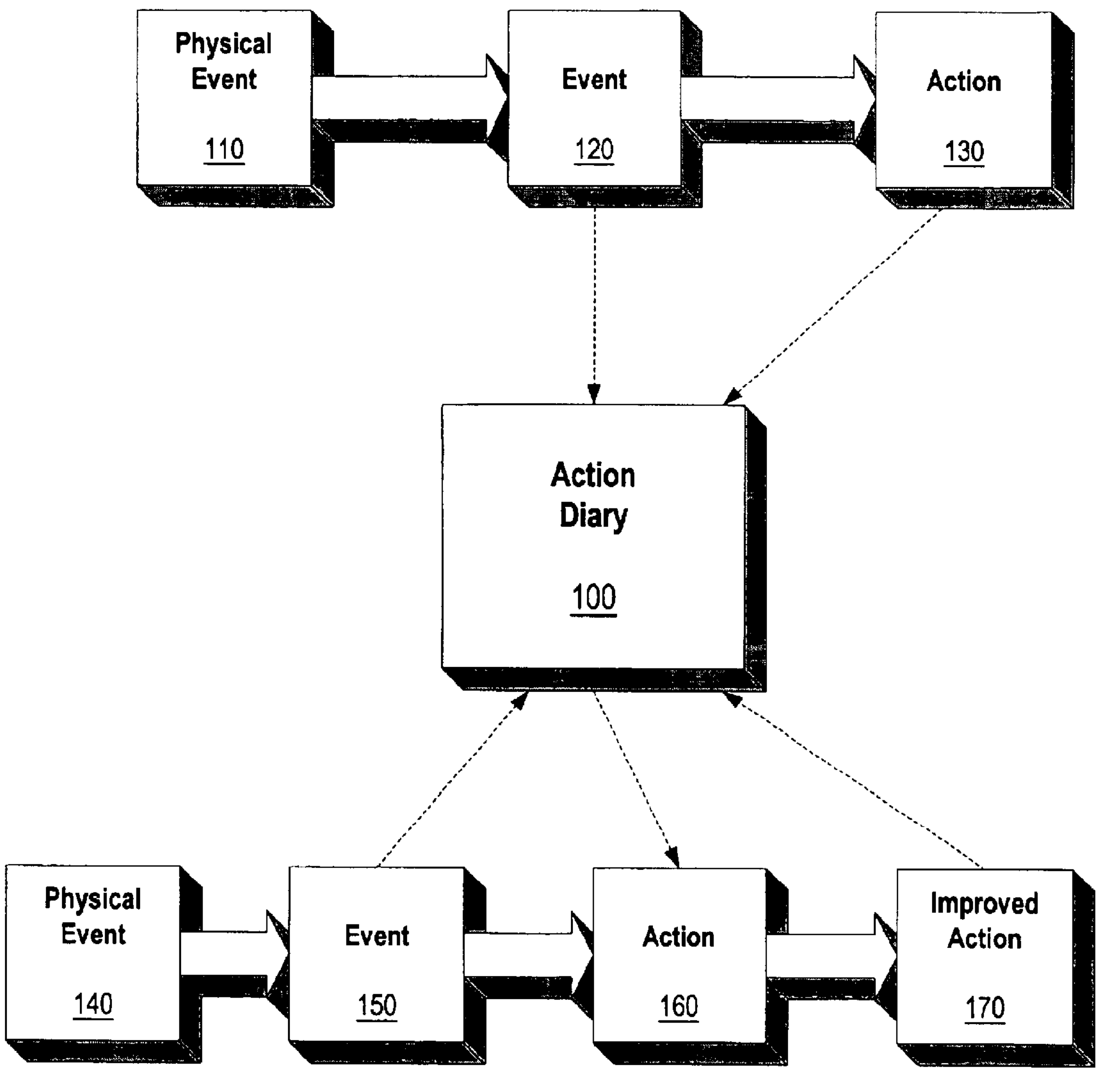
FIG. 1 is a block diagram of use of an action diary to capture the lifecycle of best practices.

FIG. 1 is a block diagram of use of an action diary to capture the lifecycle of best practices. Physical event 110 occurs in the computer system. Physical event 110 may include such events as a disk being full, a router being down, a processor being pegged, a database being down, and a link being down as well as any other events that may occur in the computer system. Physical event 110 relates to system event 120. System event 120 may be created by a system management tool that monitors various physical events or may be a signal or message sent by the physical device, such as an application program being programmed to send a message to an operator when a problem occurs. System event 120 is processed by action diary 100 that contains the lifecycle of best practices in handling this system event. Action diary 100 determines a best practice method, or approach, to handle the problem. The best practice approach may be an automated approach or may be an approach that provides the operator with information regarding handling the situation. Further actions 130 may be discovered that aid in handling the event. Further actions 130 are included in action diary 100 in order to reflect the organization's refined best practice for handling the event.

Physical event 140 is the same as physical event 110 but occurs at a later time. Event 150 is received by action diary 100. Action diary 100 now includes further actions 130 that were included in the action diary during the first occurrence of the event. Action diary 100 responds to event with action 160. Again, action 160 may include an automated, semi-automated, or manual approach for handling the event. Newly discovered or improved actions 170 are again included with action diary 100 to capture the best current practice of handling the event. As action diaries evolve and continually improve, a preferred result would be that manual approaches become more and more automated as increased knowledge is gained about the system events. As the approaches become more automated, manual effort on the part of the operator is preferably decreased thereby increasing the efficiency of the operator as well as the efficiency of responding to system events. Operator efforts can be shifted from manual approaches to developing more and more automated approaches to system events.

Figure 2:
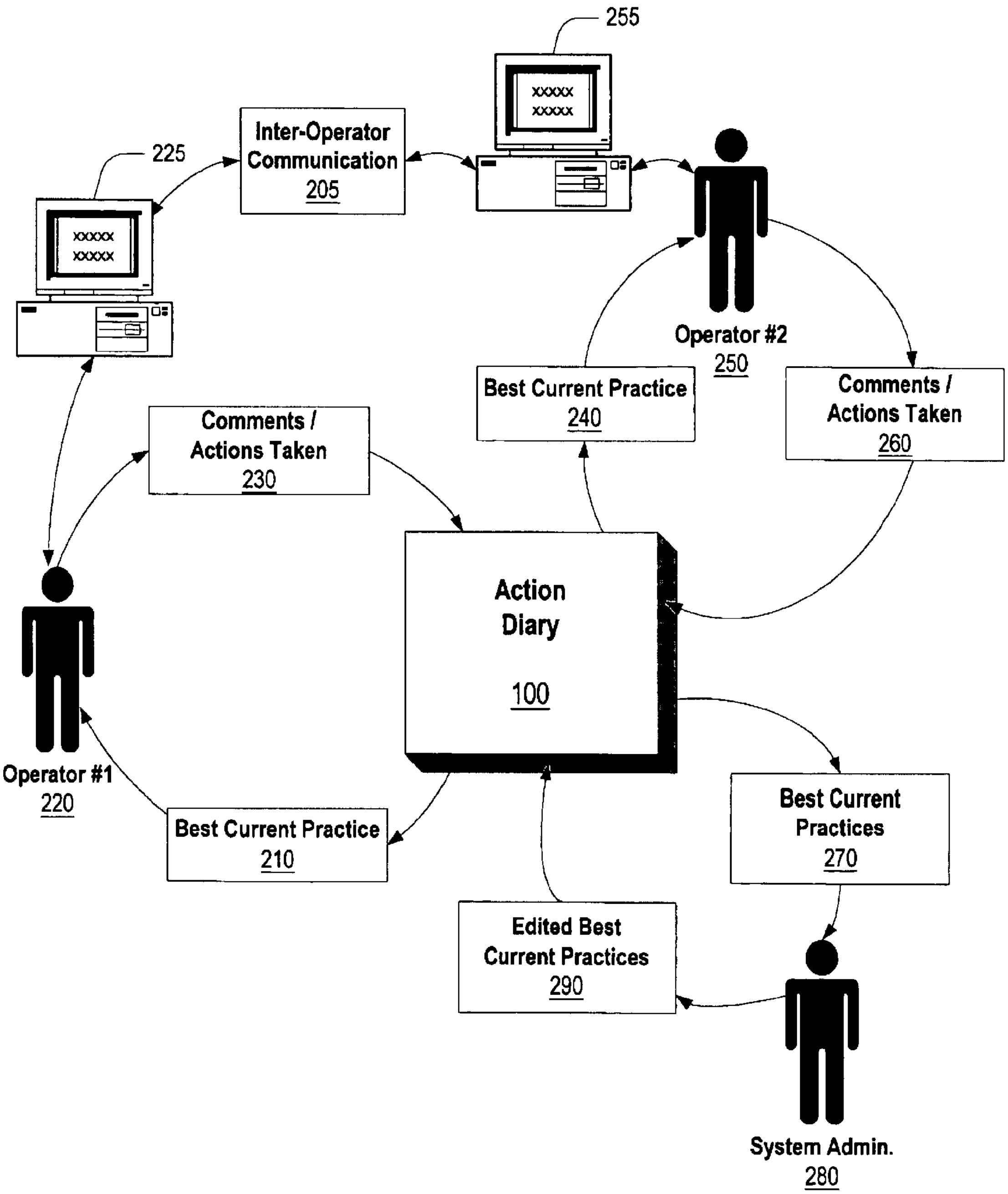
FIG. 2 is a diagram showing an action diary used to coordinate the efforts of multiple operators.

FIG. 2 is a diagram showing an action diary used to coordinate the efforts of multiple operators. When an event occurs, best current practice 210 (i.e. an approach) to handling the event is provided to operator 220. Operator 230 performs actions to handle the event. These actions and related comments 230 are included with action diary 100 to update the approaches to handling the event and to capture the current knowledge regarding handling of the event. Later, when the event happens again, operator 250 may be at an entirely different location from operator 220 or even off-site (i.e. being notified of the event while at home). Operator 250 receives best current practice information 240 from action diary 100. The best current practice now includes the approach included by operator 220. In this way, operator 250 is able to learn from and again knowledge from operator 220 without communicating directly with operator 220. Operator 250, in turn, may learn more about the event and provide further actions and comments 260 to action diary 100.

Some problems are more complex and involve the efforts of multiple operators simultaneously. To facilitate collaboration in handling system events, operator 220 uses computing device 225 to communicate with operator 250 who is using computing device 225. Inter-operator communication program 205 is used to facilitate real time communication between operators. Inter-operator communication program 205 may include "chat" windows for communicating between operators using a keyboard and a window to display other operators' messages. While two operators are shown in FIG. 2, any number of operators can work together in handling a system event with each operator having a computing device and using an inter-operator communication program to communicate with other operators. In addition, experts from outside the system, such as the vendor that supplied a particular device or software package, may be included in the on-line discussion for handling the events. The information gathered from the multiple operators is included with action diary 100. These communications and access to these communications can be facilitated by the action diary (e.g. the same event instance checked out by two operators opens a communication channel between the operators). In addition, two related events that are different instances but related by the same cause event instance can open a channel between the operators. Dialog, or chat, between the operators can be captured and stored.

Comments that are provided by operators and actions that are attempted to handle an event often will not accurately reflect the actual actions that handled the event nor will all comments make complete sense when prepared by the operator while attempting to handle an event. For this reason, best current practices may need to be edited to weed out inaccurate or superfluous information that was captured by the operators. As shown, best current practices 270 are reviewed by system administrator 280 in order to review and edit the best current practice information. The system administrator function may be performed by a particular experienced person or may be performed by operators when they have additional time to review the best practices information. Edited best current practices 290 are included with action diary 100 to again reflect the best current practice available for handling events.

Figure 3:
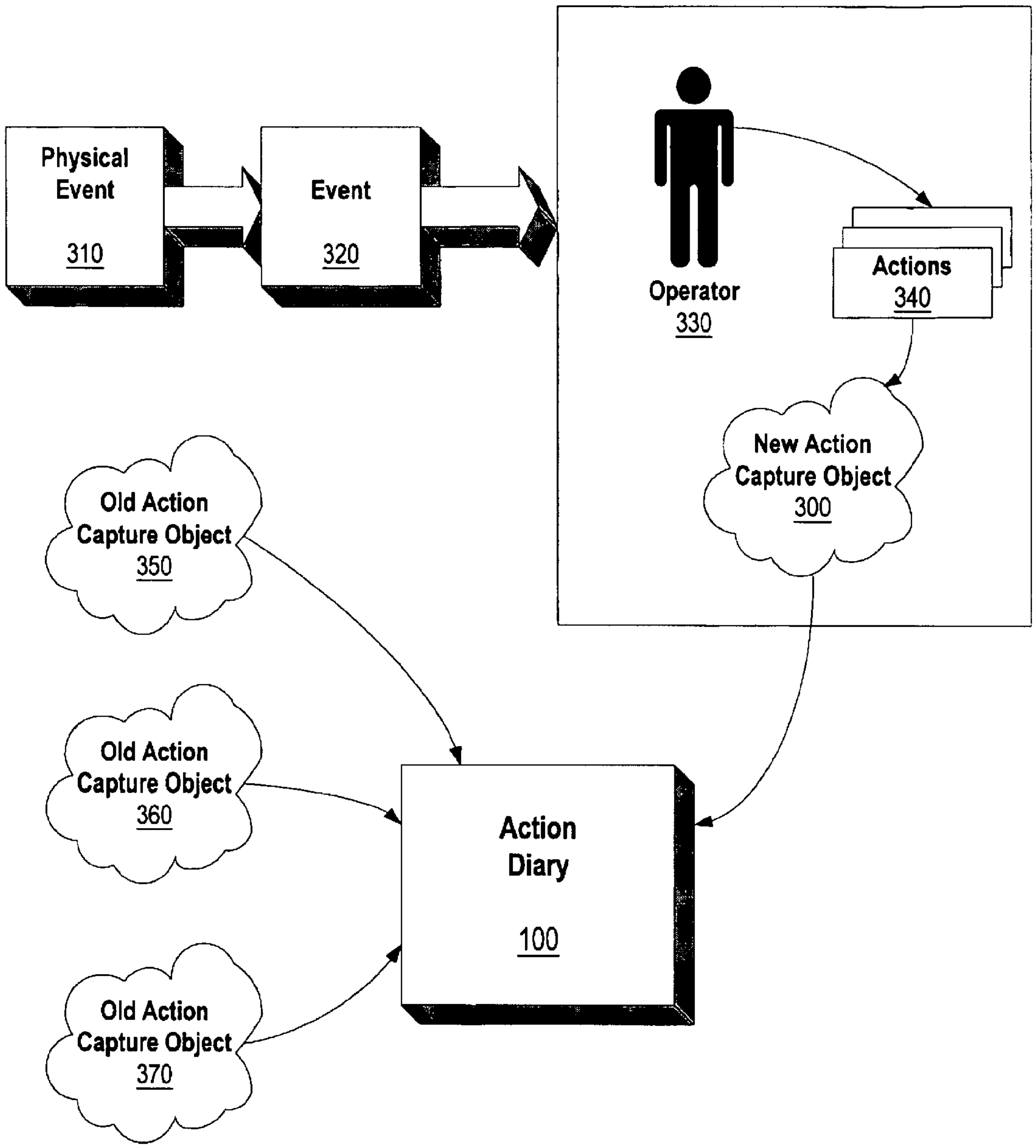
FIG. 3 is a diagram showing an action capture object being created from an operator's actions and stored in an action diary.

FIG. 3 is a diagram showing an action capture object being created from an operator's actions and stored in an action diary. Physical event 310 corresponds with system event 320 that is to be handled by operations. Action diary 100 includes various actions (old action capture object 350, 360, and 370) that correspond with system event 320. The best current practice includes actions 340 used to handle system event 320. The system, either with operator 330 assistance or acting in an automated fashion, handles system event 320 using actions 340. Actions 340 are captured in new action capture object 300 and included with action diary 100. Actions 340 included in new action capture object 300 are preferably more automated than actions included in old action capture objects (i.e. old action capture objects 350, 360, and 370).

Figure 4:
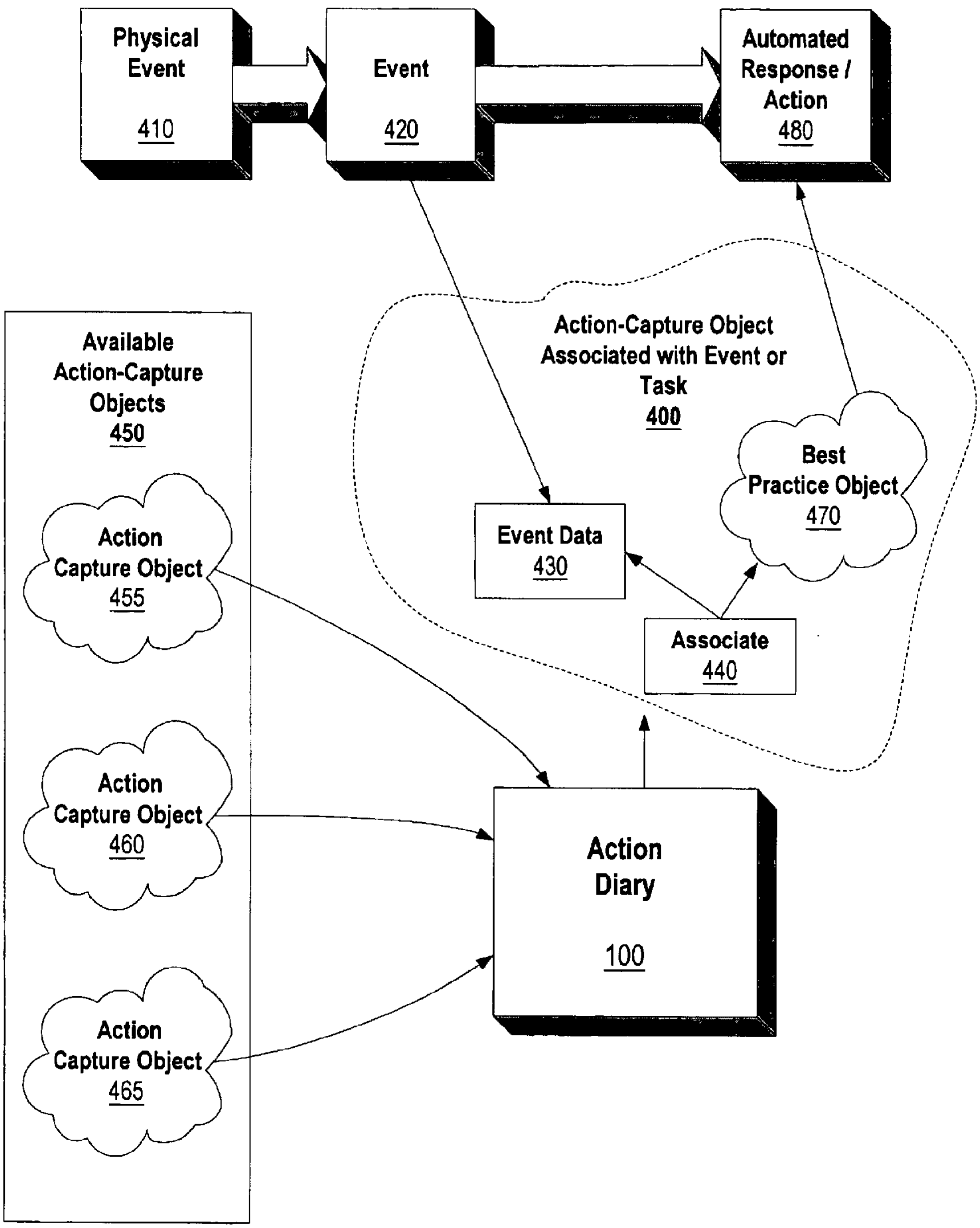
FIG. 4 is a diagram showing actions being associated with incoming events to created automated responses.

FIG. 4 is a diagram showing actions being associated with incoming events to created automated responses. Physical event 410 corresponds with system event 420. System event 420 includes event data 430 aids in describing and identifying the system event and the corresponding physical event. Available action capture objects 450 include one or more action capture objects that include actions and comments helpful in handling a corresponding event. In the example shown, available action-capture objects 450 include action capture object 455, action capture object 460, and action capture object 465.

Action-capture object associated with event or task 400 includes association 440 that associates incoming event data 430 with best practice object 470. The association (440) of best practice object 470 and event data 430 is included in action diary 100. Best practice object 470 includes actions and comments for handling the event. Best practice object 470 is also included in action diary 100. When an association is made between incoming event data 430 and best practice object 470, actions included with best practice object are taken (automated response/action 480). While an automated response is shown, best practice 470 may include a semi-automated approach or even a manual approach. In semi-automated and manual approaches, information regarding the best practices is provided to the operator to assist in handling the event. The operator's handling of the event is in turn captured so that the operator's improved handling of the event or comments related to handling the event are included in action diary 100 for future handling of a similar event. One of the actions that is captured and associated with events is annotations from the operator, or operators, handling the event. By capturing annotations, future operators faced with the same event can view the annotations and benefit from solutions tried before for the event.

Figure 5:
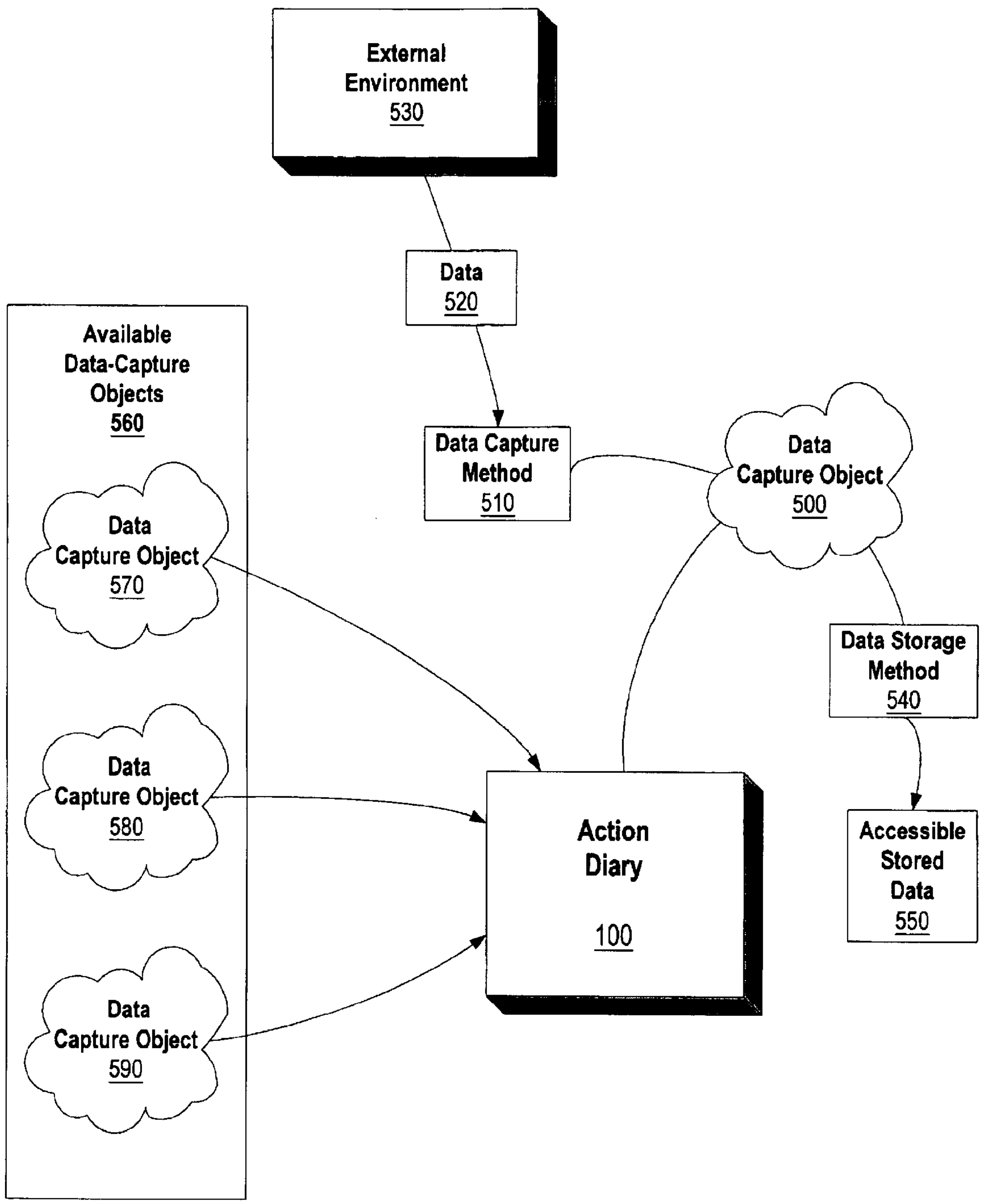
FIG. 5 is a diagram showing a data capture object being created and stored in an action diary.

FIG. 5 is a diagram showing a data capture object being created and stored in an action diary. A particular event may require different handling depending upon the status of other components or data from outside data sources. This external data may form an integral, if not crucial, component of the best practice handling of an event. FIG. 5 shows how external data is captured and included in action diary 100.

External environment 530 may include other components as well as sources of data. Data 520 relating to external environment 530 is gathered. In addition, data capture method 510 included the process for gathering data 520 is included with data capture object 540. Also included with data capture object 500 is data storage method 540 that includes the process of storing data 520 to form accessible stored data 550. Accessible stored data 550 is accessible by action diary components, such as particular actions, that may use the data in determining a course of action in responding to an event. Available data capture objects 560 are included with action diary. In the example shown, available data capture objects 560 include data capture object 570, data capture object 580, and data capture object 590. Components within these data capture objects, such as previously stored data capture methods and data storage methods, are available for creating new data capture objects, such as data capture object 500.

Figure 6:
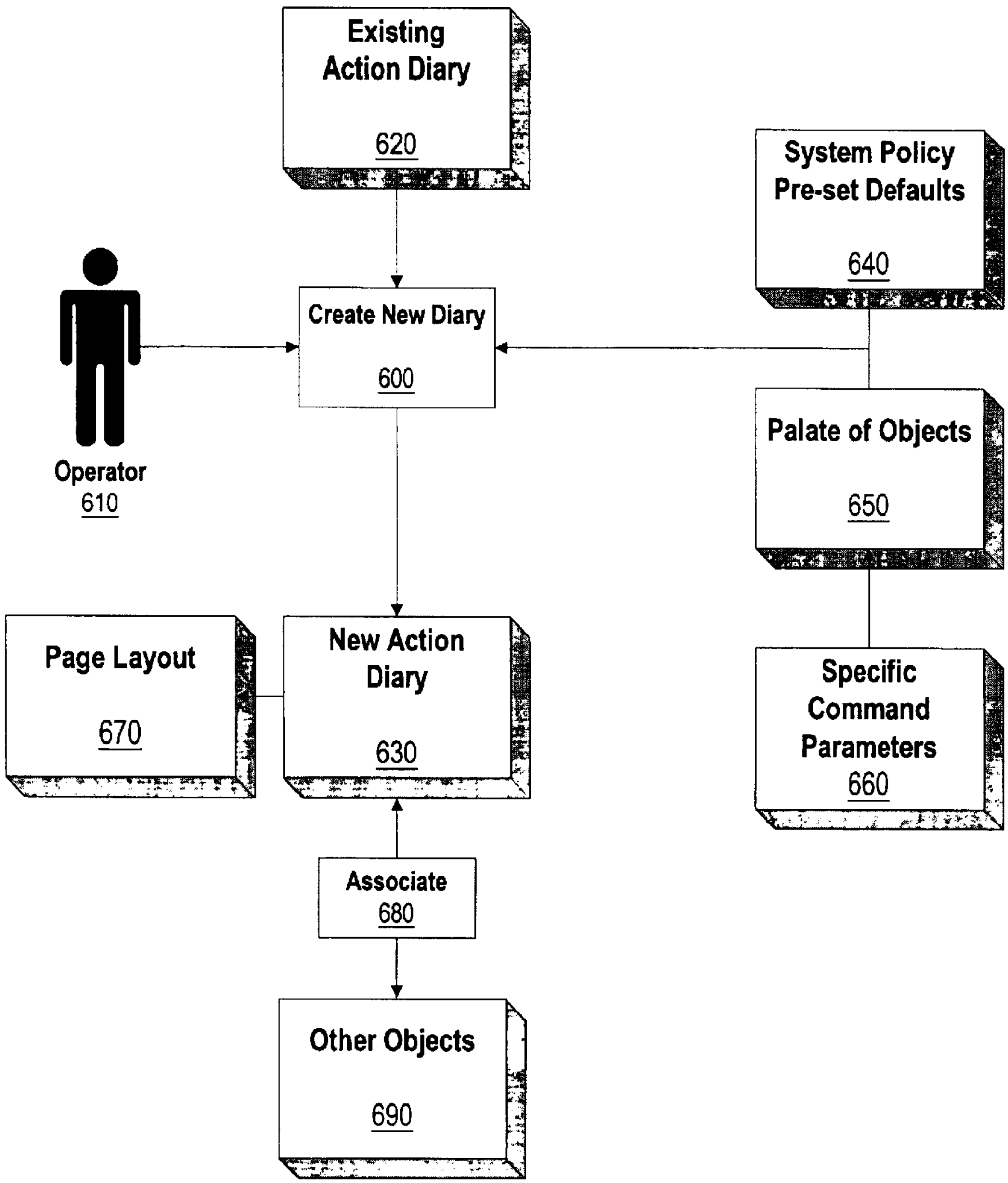
FIG. 6 is a diagram of an operator creating a new action diary from existing system components.

FIG. 6 is a diagram of an operator creating a new action diary from existing system components. While an operator is shown in the example in FIG. 6, operator involvement is not required as automated approaches may be used to create new action diaries from existing action diaries based on an incoming event or other trigger. Existing action diary 620 can be included as input for creating a new action diary (process 600). Creation of a new diary may also include system policy pre-set defaults 640. System policy pre-set defaults 640 may determine whether certain diary components, such as documentation fields, timestamps, creator, and associated link object are included in the new diary. System policy pre-set defaults 640 may also place these fields in pre-determined locations on an action diary page. Palette of objects 650 can be used by the operator to include objects such as text boxes, predefined actions, and other visual controls into the action diary page. Some visual controls, such as predefined actions, may have specific command parameters that correspond with the visual control. These parameters are also included with the action diary.

The use of one or more components, such as other existing action diaries, system policy pre-set defaults, palate of objects, and specific command parameters result in new action diary 630. New action diary 630 includes page layout 670 for using the action diary. Page layout 670 includes visual controls, text boxes, actions, document fields, timestamps, auditing information (i.e. which operators created/modified the action diary) and other information. New action diary 630 may be associated (680) with other objects 690 in the system. For example, a new action diary may be associated with other action diaries used to handle similar type events. Data capture and action capture objects may also be associated with new action diary 630. New action diary 630 may be used as an existing action diary to create yet another new action diary 630. In this manner, the action diary can iteratively be improved in light of improvements made to included components and associated objects.

Figure 7:
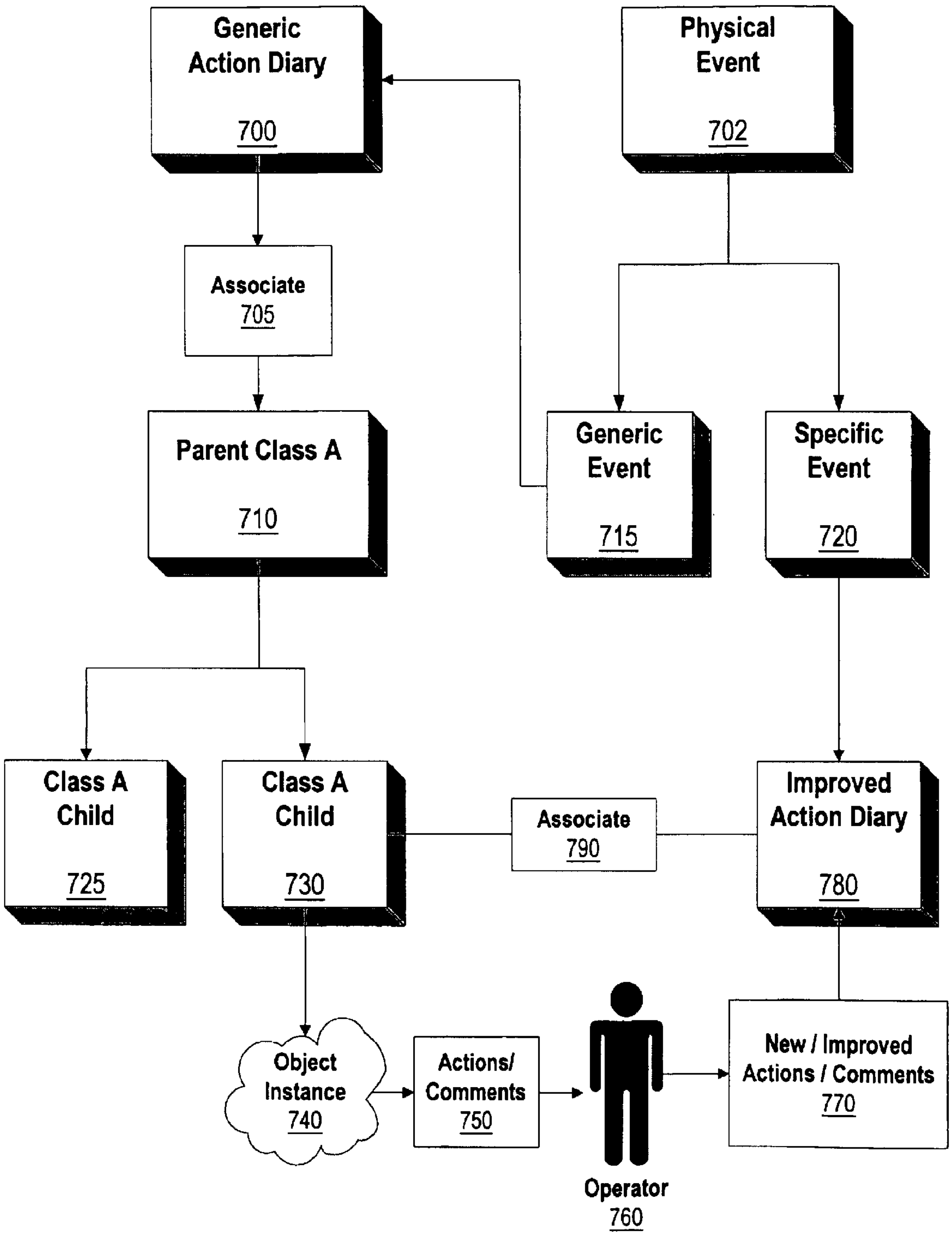
FIG. 7 is a diagram showing more specific child objects being created from more general parent objects to create improved action diaries.

FIG. 7 is a diagram showing more specific child objects being created from more general parent objects to create improved action diaries. An object oriented framework allows action diaries to inherit characteristics and components from parent objects in creating child objects. Child objects can be tuned to effectively handle a particular event.

In the example shown, three generic action diaries are shown associated with three parent classes. Generic action diary 700 is linked to parent class 710 with association 705. The generic action diaries shown may be separate action diaries or one common action diary. When physical event 702 occurs, generic system event 715 is generated. Generic system event 715 may, for example, be that a router has gone down. Generic action diary 100 is associated with generic event 715. An operator working with generic action diary 700 attempts to resolve generic event 715. Generic action diaries may not be best suited to handling all event types. For example, a generic router action diary may provide basic information about the router problem and some general annotations to the operator handling and event. Greater control over events, however, can often be attained when events are divided into more specific events, for example an action diary responsive to a particular type of router event.

Parent class 710 is shown parenting two child objects, Class A Child 725 and Class A Child 730. As an example, parent class A 710 may include objects and components to handle generic routers. Child objects are created to address handling of more specific routers. The child objects inherit the generic router event handling capabilities of their parent and are further modified to address a more specific router situation. Class A Child 730 is used to create object instance 740. Object instance 740 includes actions, comments, and perhaps data capturing methods that assist operator 760 in handling an event. New or improved actions and comments are included in improved action diary 780. Improved action diary 780 is associated (790) with Class A Child 730. Improved action diary 780 is also associated with specific event 720. Specific event 720 is created from physical event 702. Data included in generic event 715 and specific event 720 may be largely the same. However, the association between the action diary and the event is more particularized for a specific event than for a generic event. A generic action diary may, for example, be associated with any router event. A specific action diary, on the other hand, may be associated with a particular type of router. The specific action diary may include commands for automatically handling a specific event, such as a command string used to reset a particular type of router.

As Class A Child 730 iteratively improved by including further actions/comments and further improved action diaries it becomes more refined and better able to handle the incoming events. While Class A Child 730 may be designed to handle a particular type of event, for example a particular type of router or a particular router, other Class A children, such as Class A Child 725 may be directed at other particular types of events (i.e. other routers). In this manner both general handling of general event 715 as well as specific handling of specific event 720 is provided. With increased knowledge, both the generic and specific action diaries are improved over time to capture the best practices in handling generic events, such as a router going down, as well as a specific events, such as a particular type of router going down.

Figure 8:
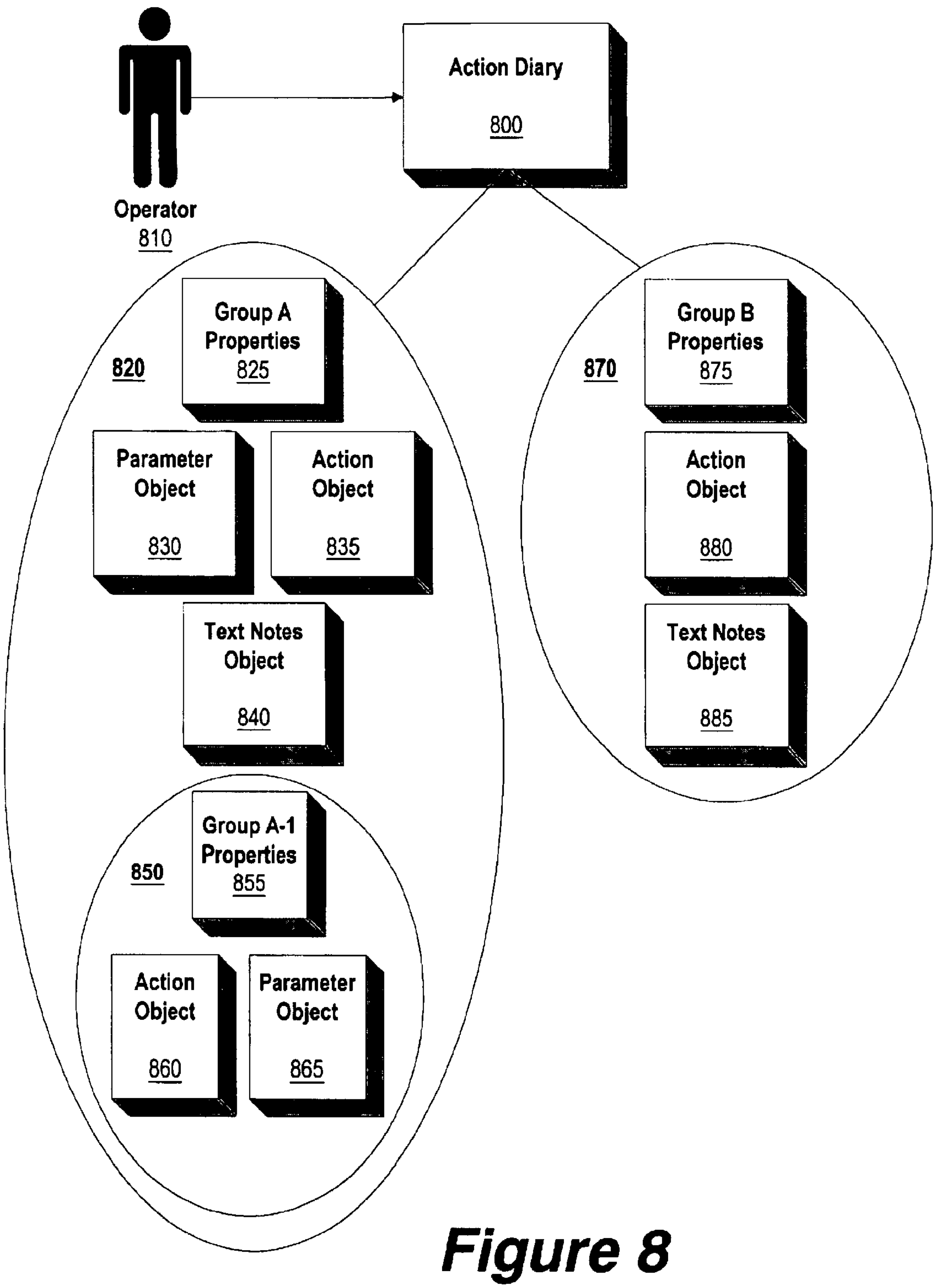
FIG. 8 is a diagram showing action diary objects being grouped and nested.

FIG. 8 is a diagram showing action diary objects being grouped and nested. Operator 810 interfaces with action diary 800. Action diary 800 includes various approaches for handling events. Approach 820 and Approach 870 are included with action diary 800. Approach 820 includes a variety of properties, objects, and methods. objects vague. Contains rationale and indications for this particular approach, display properties, notes, suggested actions with suggested parameters where applicable, executable commands with specified parameters where applicable, historical data Approach 820 includes nested Approach 850. Approach 820 includes Group A Properties 825. Group A Properties 825 includes properties regarding the Approach 820. Properties may include actions and visual controls that are included. Approach 820 also includes action object 835. Action object 835 includes one or more actions included with the approach to respond to incoming events. Approach 820 also includes parameter object 830. Parameter object 830 includes parameters for action objects, such as command parameters and input parameters. Approach 820 also includes text notes object 840. Text notes object 840 includes text notes regarding the approach. Text notes can be read by operators to assist operators in handling an event. Approach 820 also includes nested approach 850.

Approaches can be nested as the operator deems appropriate. A nested approach may reflect an alternative or additional approach to handling an event. In the example shown, nested approach 850 includes group A-1 properties 855, action object 860, and parameter object 865. These properties, action objects, and parameters are similar to the properties, action objects and parameter objects previously described, however properties 855, action object 860, and parameter object 865 correspond with nested approach 850.

A second approach, approach 870, is shown included with action diary 800. Approach 870 includes Group B Properties 875, action object 880, and text notes object 885. These objects are similar to their corresponding counterparts described within approach 820. The two approaches shown, approach 820 and approach 870, may correspond to an improvement made to action diary 800. Approach 870 could be an example of an older approach that has been improved and included as approach 820. For example, approach 820 includes parameter object 830. A corresponding parameter object is not included with approach 870. It may be that parameters have been discovered to improve the approach and included with new approach 820. Likewise, nested approach 850 includes an action and a parameter. As approach 820 may be new, alternative actions and/or parameters may be included in nested approach 850. Over time, the actions and parameters can be refined so that a more automated or improved approach to handling an event results.

Figure 9:
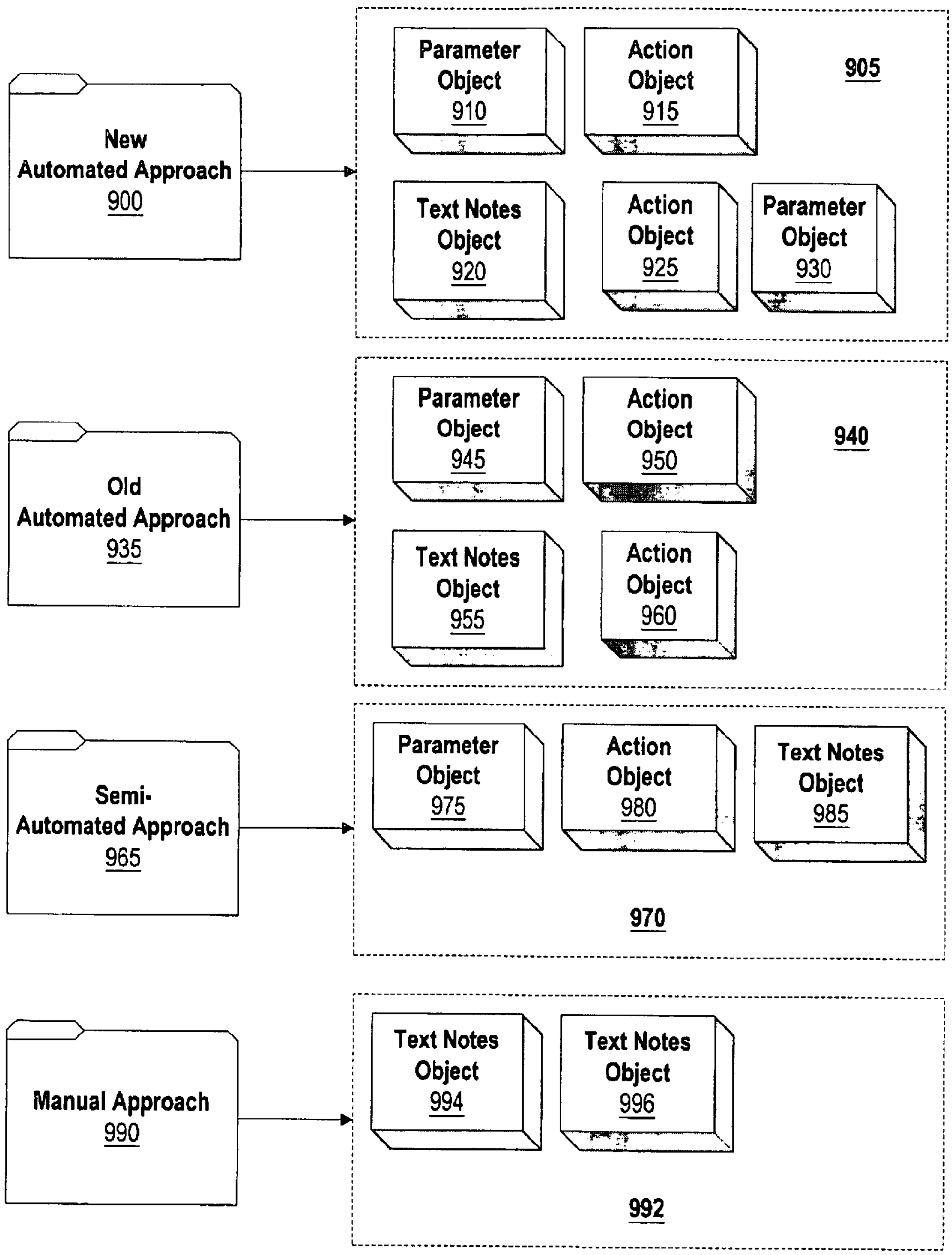
FIG. 9 is a diagram showing various approaches within an action diary and their respective components.

FIG. 9 is a diagram showing various approaches within an action diary and their respective components. New automated approach folder 900 includes new automated objects 905. Automated objects 905 include parameter object 910, action object 915, text notes object 920, action object 925, and parameter object 930.

Old automated approach folder 935 includes old automated objects 940. Old automated objects 940 include parameter object 945, action object 950, text notes object 955, and action object 960. Note that new automated approach 905 includes an extra parameter object 930 not found in old automated approach 940. It may be that the new parameters were included to improve the automated approach. However, because the new automated approach may have been used a few times (and therefore may have bugs that still need to be worked out) the operator may wish to keep older approaches such as old automated approach until he or she is satisfied that new automated approach 905 will work successfully.

Semi-automated approach folder 965 includes semi-automated objects 970. Semi-automated objects 970 include parameter object 975, action object 980, and text notes object 985. Note that old automated approach 940 includes an extra action object 960 not found in semi-automated approach 970. Again, the extra object in old automated approach 940 may reflect an additional improvement that was made to automate the approach. The steps performed in the extra action object may have been manually performed by the operator in the semi-automated approach. Notes concerning these additional steps may have been included in text notes object 985 for operator reference.

Finally, manual approach folder 990 includes manual objects 992. Manual objects 992 include text notes object 994 and test notes object 996. Steps described in one or both of these text note objects may have been automated and included as action object 980 and parameter object 975 in the semi-automated approach.

The various approaches shown in FIG. 9 reflect a lifecycle of best practices to handle an event. The lifecycle shown evolves from a manual approach (992) to a new (and hopefully improved) automated approach 905. Because computer systems are dynamic and ever-changing, new changes to the computer system may cause a newer approach to fail. Keeping older approaches allows the operator to fall back on previous approaches should the current best practices approach prove less than successful. In addition, more automated approaches may be more specifically directed towards a particular event while older approaches may be less specific. Older approaches, therefore, may be a better starting point for developing a new action diary to handle a different event.

Figure 10:
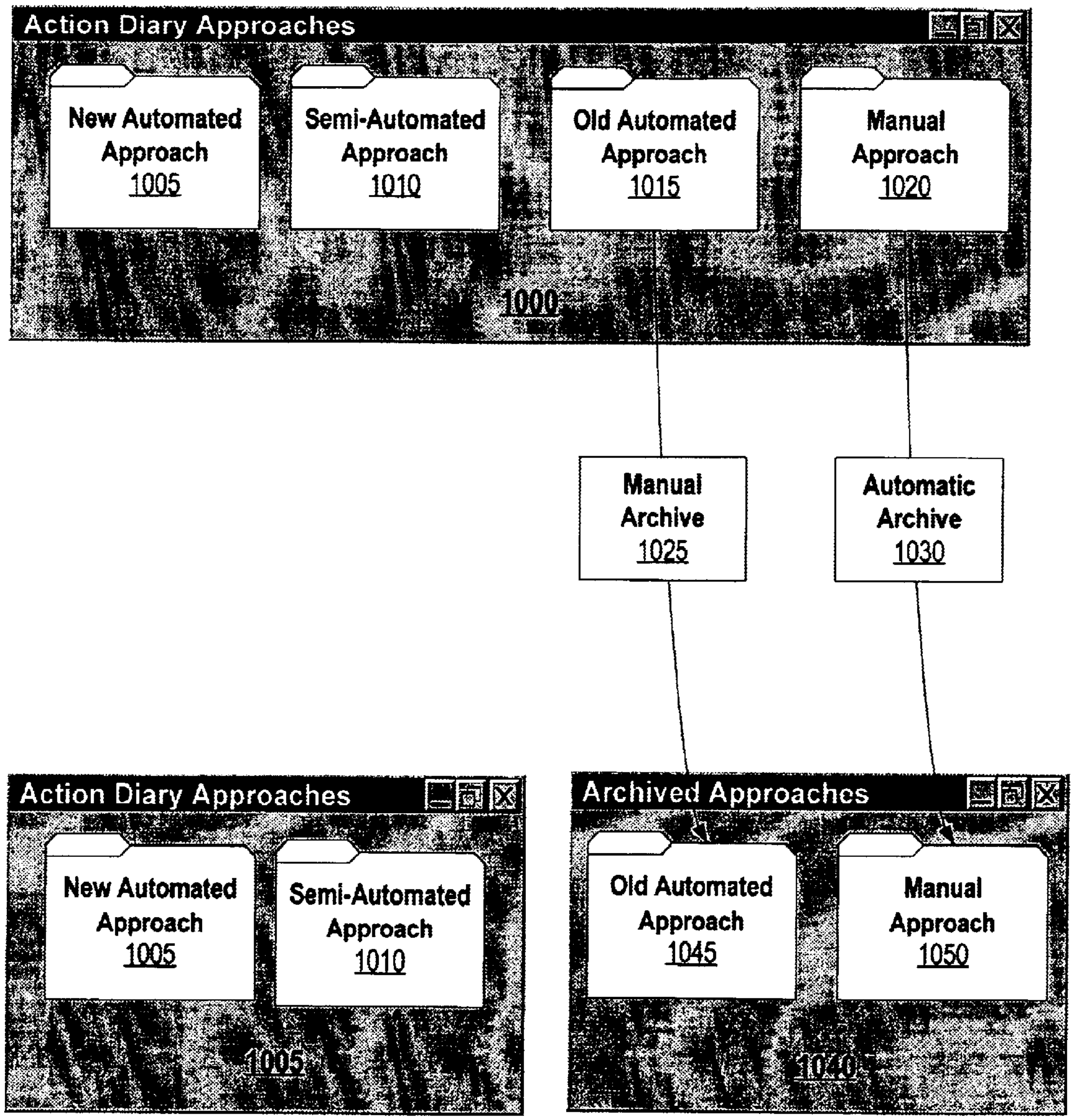
FIG. 10 is a diagram showing outdated approaches being archived.

FIG. 10 is a diagram showing outdated approaches being archived. Action diary approaches 1000 includes new automated approach 1005, semi-automated approach 1010, old automated approach 1015, and manual approach 1020. The icons representing the various approaches are highlighted to indicate the maturity of the approach within the lifecycle. Lightly shaded folders are less automated (i.e. manual approach 1020) while darkly shaded folders are more automated approaches (i.e. new automated approach 1005). The highlighting, or shading, of various approaches aids operator in identifying the stage of approaches within the lifecycle. In addition, different icons can be used to represent the stage within the lifecycle with a solid approach using one icon and a new, untested approach using another icon. The operator can choose to archive approaches that do not work well or have been successfully replaced by new improved approaches. Manual archive 1025 is performed by the operator indicating which approaches to archive. In one implementation, the operator selects the approach(es) he or she wishes to archive and drags them to archive approaches window 1040 using a pointing device, such as a mouse. In the example shown, old automated approach 1015 has been moved to archived approaches window 1040. In addition, rules may be included to automatically archive outdated approaches. For example, if an approach has not been used for a certain period of time as established by the archival rules, the approach is automatically archived. As shown, automatic archival process 1030 moves manual approach 1020 from action diary approaches 1000 to archived approaches 1040. After the manual and automatic archive processes are performed, action diary approaches window 1005 results from action diary approaches window 1000. In addition, archived approaches window 1040 now includes the two archived approaches. Archived approaches may be stored on separate media, such as a tape or a removable storage device, so that they no longer take space on the system storage device. Alternatively, archived approaches may be stored in a separate location, or directory, on the system storage device. In addition, archived approaches may be deleted, however deleting the approaches prevents their recovery should the need arise.

Figure 11:
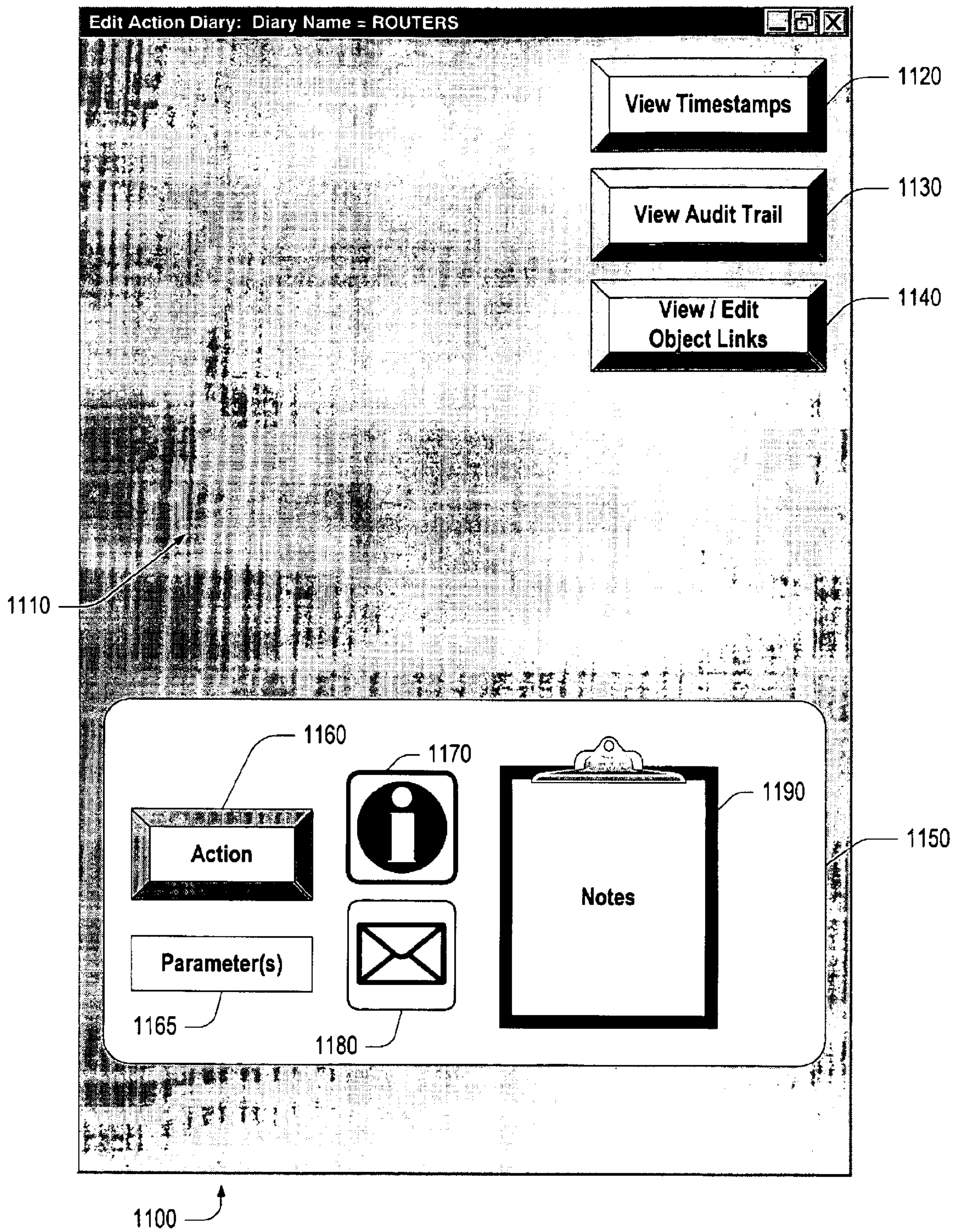
FIG. 11 is a diagram of a user interface for creating and maintaining action diaries.

FIG. 11 is a diagram of a user interface for creating and maintaining action diaries. User interface 1100 includes action diary window 1110 used for displaying information regarding the action diary. The title bar indicates that the action diary being shown is named "ROUTERS" so action diary window 1110 would further be used for displaying action diary information about handling router events. Palette to associate events to action diary view change history command button 1120 is used to display information concerning changes made to the action diary including audit information concerning operators who created and modified the action diary. View/Edit object links command button is used to view or modify links between the action diary and other system objects. For example, other approaches related to the action diary could be displayed as well as data capture and action capture objects. Visual control palette 1150 includes visual controls for including objects with the action diary. Action command button 1160 is used to place an action on action diary window 1110. Once placed on action diary window, the command button can be selected and modified to display a caption in the button describing the action. Action command button one further be used to capture the operator's manual actions into a script file that can be executed in the future by simply pressing the command button. Parameters button 1165 is used to include parameters that can be linked to other objects, such as action command buttons, that are placed on action diary window 1110. Informational icon 1170 is used to display or link information to action diary window 1110. In addition, parameters can be specified within the action object handling the event. Information may be entered by the operator or may be linked to an external document reference such as an online reference book. Email icon 1180 is used to have messages, such as email messages or pages, to individuals when the approach included in action diary window 1110 is executed. Notes icon 1190 is used to include a notes window with action diary window 1110. A notes window would be used by operators to enter notes and comments regarding the handling of events.

Figure 12:
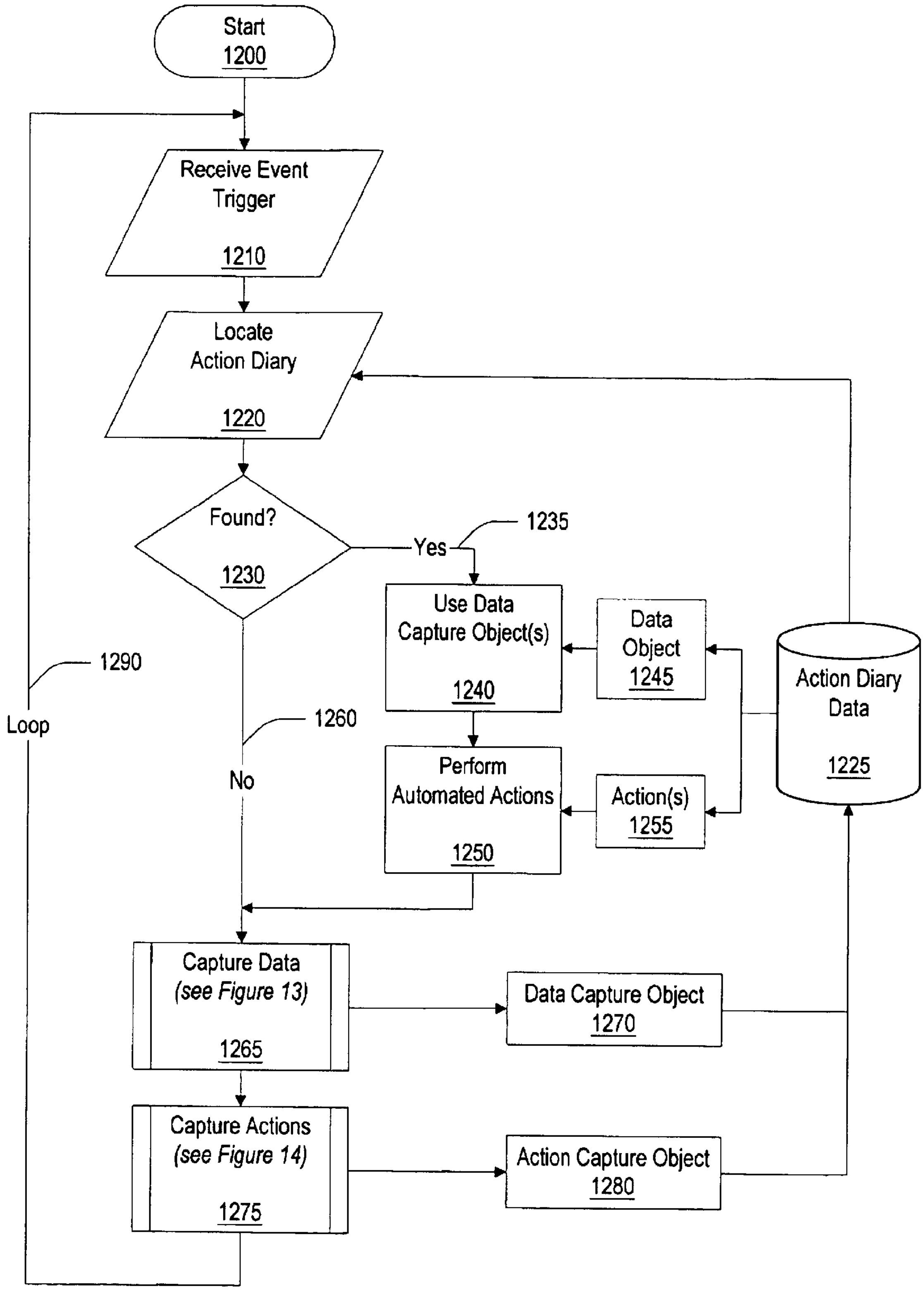
FIG. 12 is a flowchart for responding to system events using an action diary.

FIG. 12 is a flowchart for responding to system events using an action diary. Processing commences at 1200 whereupon event data is received at input 1210. The event data is used to locate a corresponding action diary (input 1220). If an action diary was found, decision 1230 branches to "yes" branch 1235. Data capture object(s) 1245 are executed (step 1240) from action diary 1225 to gather data used in handling the event. If no data capture objects exist for the event, processing simply continues to performing automated actions (step 1250). Actions 1255 are executed (step 1250) from action diary 1225. While automated actions are preferred, actions performed may include manual steps, such as displaying an action diary window with information concerning the event.

If an action diary corresponding to the event is not found, decision 1230 branches to "no" branch 1260 in order to create a new action diary responsive to the event. Predefined process 1265 captures data corresponding with handling the event (see FIG. 13 for further details regarding capturing data). The methods used to capture and store the data are included in data capture object 1270 which is included in action diary 1225. Predefined process 1275 captures actions used in handling the event (see FIG. 14 for further details regarding capturing actions). The actions used to handle the event are included in action capture object 1280 which is included in action diary 1225. After data and actions have been captured, processing returns (loop 1290) to receive the next event trigger.

Figure 13:
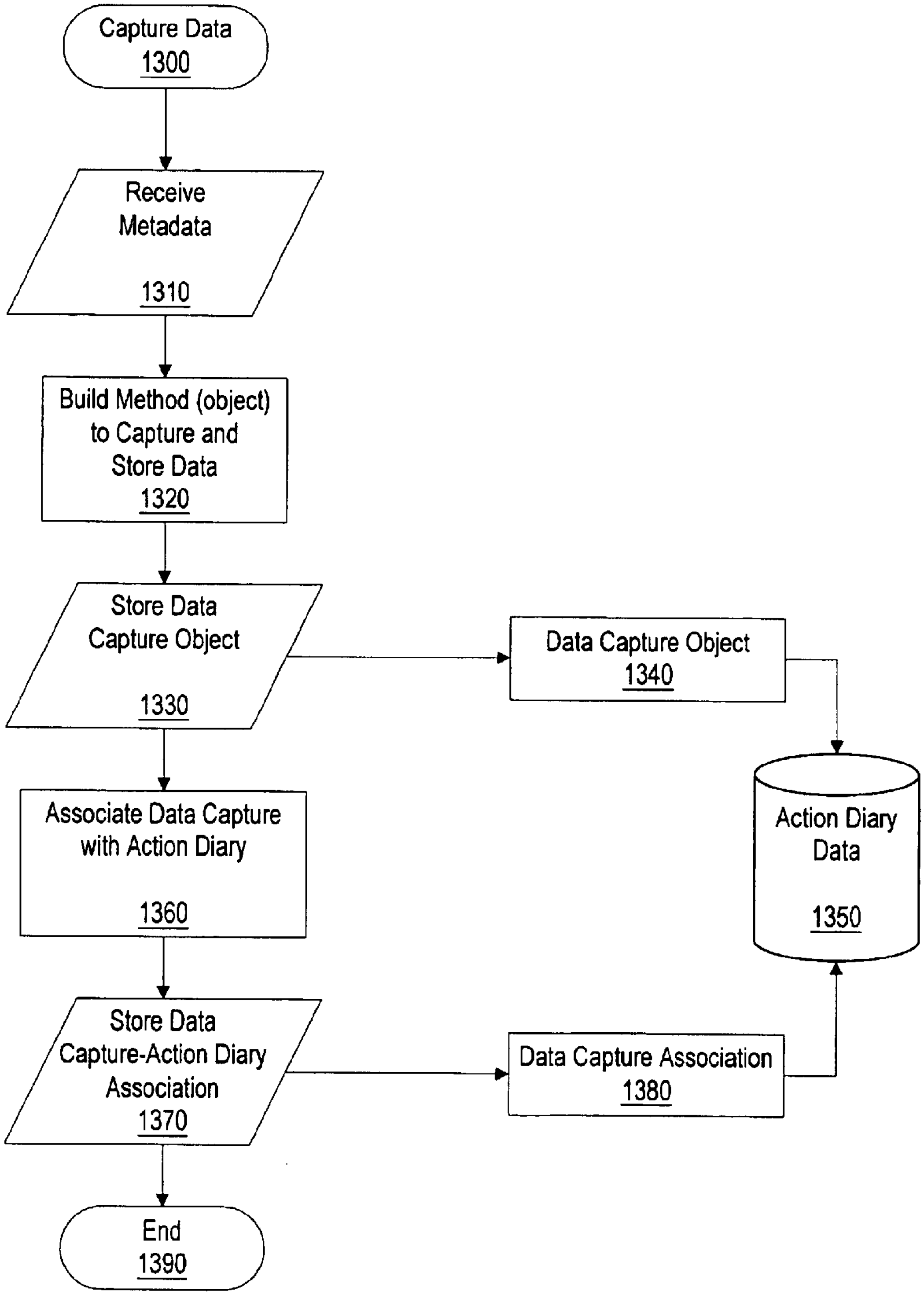
FIG. 13 is a flowchart for creating objects to capture data related to system events.

FIG. 13 is a flowchart for creating objects to capture data related to system events. Processing commences at 1300 whereupon metadata, or "data about the received metadata," is received from the operator or from another metadata source. A method to capture and store the data is built (step 1320). Two separate methods may be built (one to capture and one to store), or one method can be built with the processing steps to both capture and store the data. The methods to capture and store the data are included in data capture object 1340. The data capture object is included (output 1330) in action diary data 1350. The data capture object may be associated with one or more action diaries used to handle particular system events (step 1360). Resulting data capture associations 1380 are included (output 1370) in action diary data 1350. Processing terminates at 1390 after the data capture object and data capture associations are included with action diary data 1350.

Figure 14:
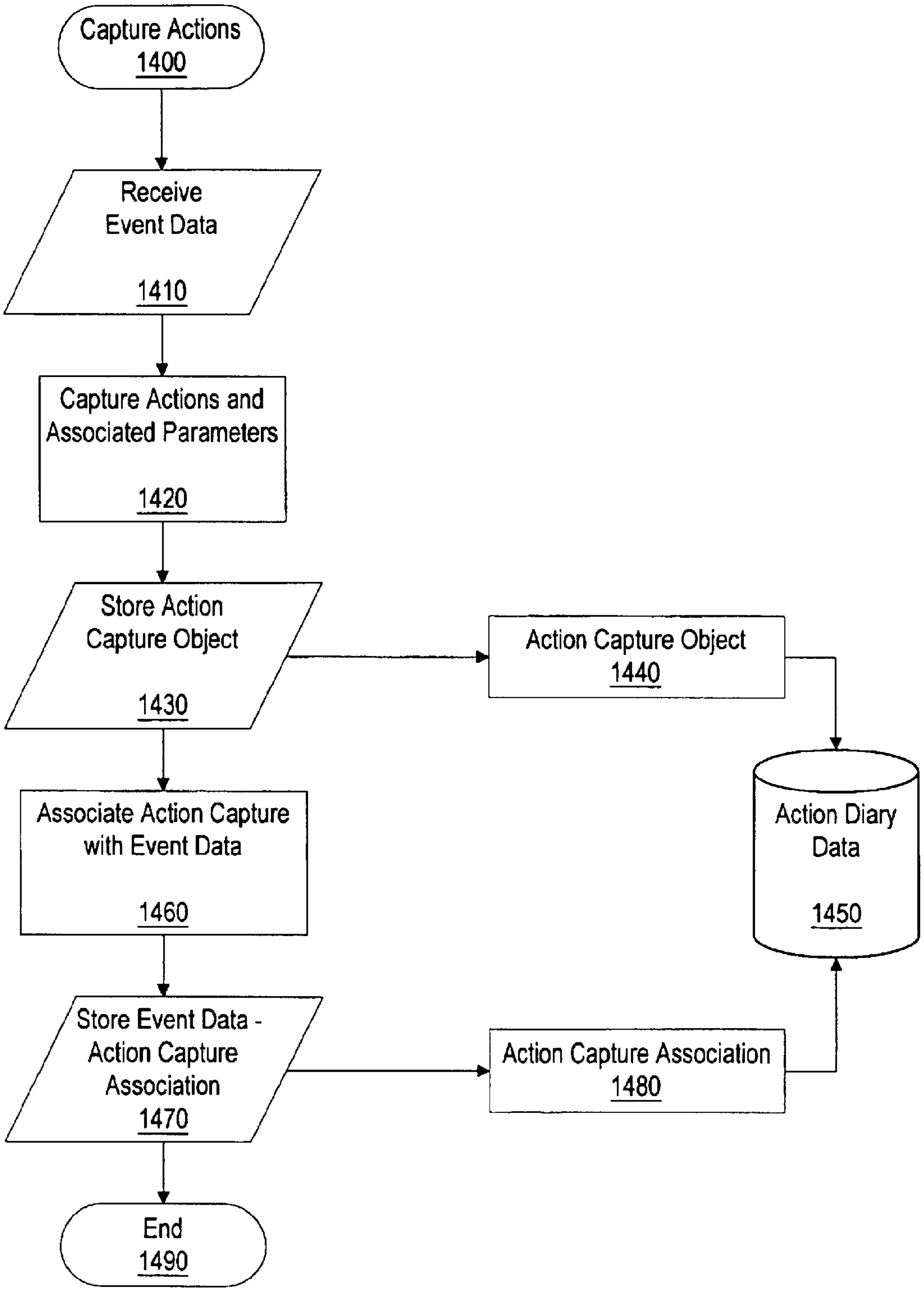
FIG. 14 is a flowchart for creating objects to capture actions and parameters related to system events.

FIG. 14 is a flowchart for creating objects to capture actions and parameters related to system events. Processing commences at 1400 whereupon event data is received from the operator or system event. The operator performs actions to handle the event. These actions and the corresponding parameters are captured (step 1420) into action capture object 1440. Action capture object 1440 is included (step 1430) with action diary data 1450. The action capture object may be associated with system event data (step 1460) resulting in action capture association 1480. Associating the system event data with an action capture object eventually allows the system to identify an action capture object using system event data that has been received. Resulting action capture associations 1480 are included (output 1470) in action diary data 1450. Processing terminates at 1490 after the action capture object and action capture associations are included with action diary data 1450.

Figure 15:
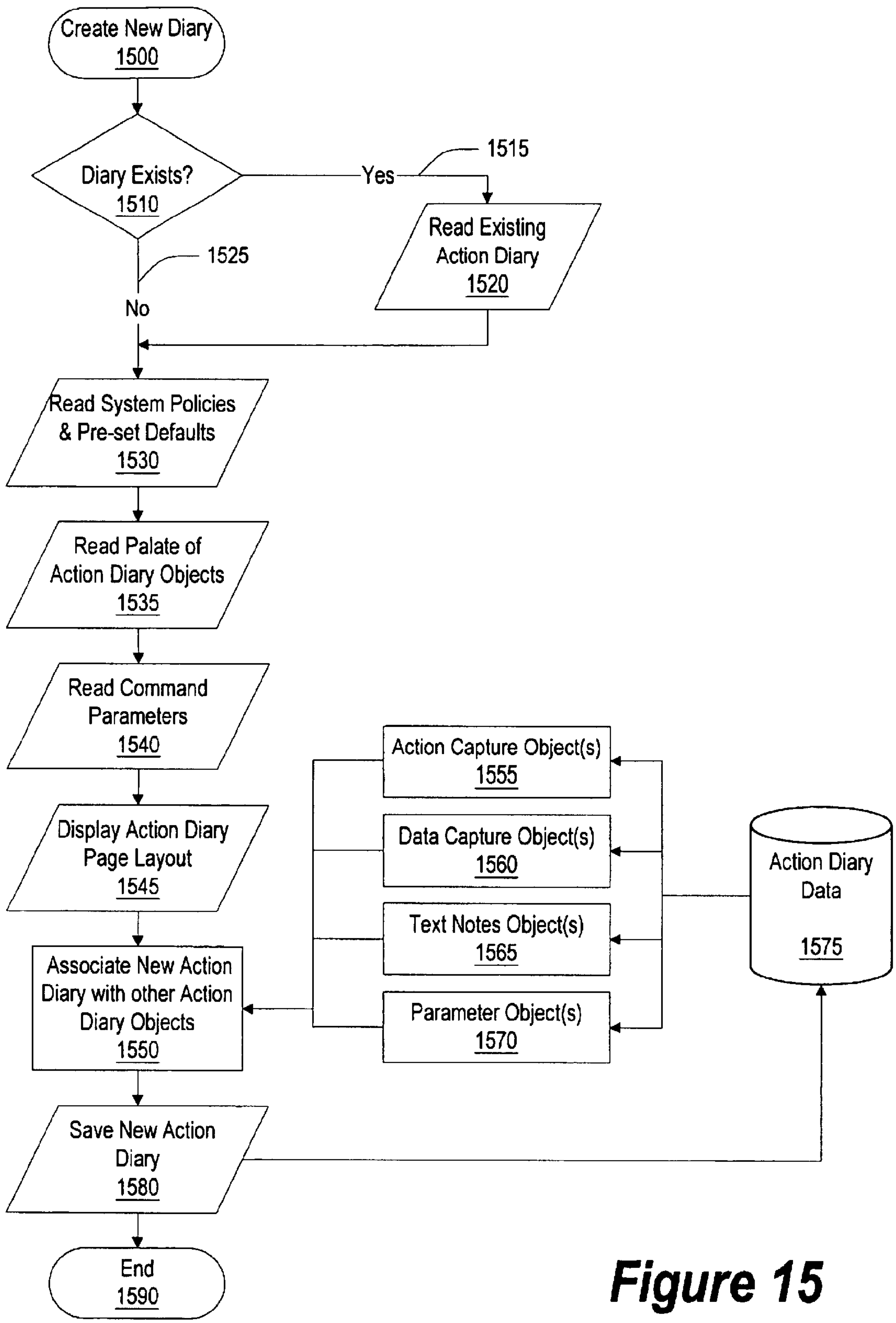
FIG. 15 is a flowchart for archiving outdated action diaries based on archival rules.

FIG. 15 is a flowchart for creating a new action diary using other system components and objects. Processing commences at 1500 whereupon decision 1510 determines whether a related action diary already exists. If a related action diary already exists, decision 1510 branches to "yes" branch 1515 and reads existing action diary information (input 1520). If a related action diary does not already exist, "no" branch 1525 is taken.

An organization may establish system policies and pre-set defaults included in action diaries. If such system policies and pre-set defaults have been established, they are read at input 1535. System policy pre-set defaults may determine whether certain diary components, such as documentation fields, timestamps, creator, and associated link object are included in the new diary. System policy pre-set defaults may also place these fields in pre-determined locations on an action diary page. Palette of action diary objects are read at input 1535. Palette action diary objects can be used by the operator to include objects such as text boxes, predefined actions, and other visual controls into the action diary page. Some visual controls, such as predefined actions, may have specific command parameters are also included with the action diary.

Display of action diary page layout (output 1545) allows the operator to view the action diary page layout and move objects as preferred by the operator. Visual controls included from the system policies and pre-set defaults and those included from the palate of action diary objects appear on the page layout enables for the user to use. The action diary is associated (step 1550) with existing objects included in the action diary such as action capture objects 1555, data capture objects 1560, text notes objects 1565, and parameter objects 1570. The new or modified action diary is included with action diary data 1575 (output 1580). Creation of a new or modified action diary terminates at 1590.

Figure 16:
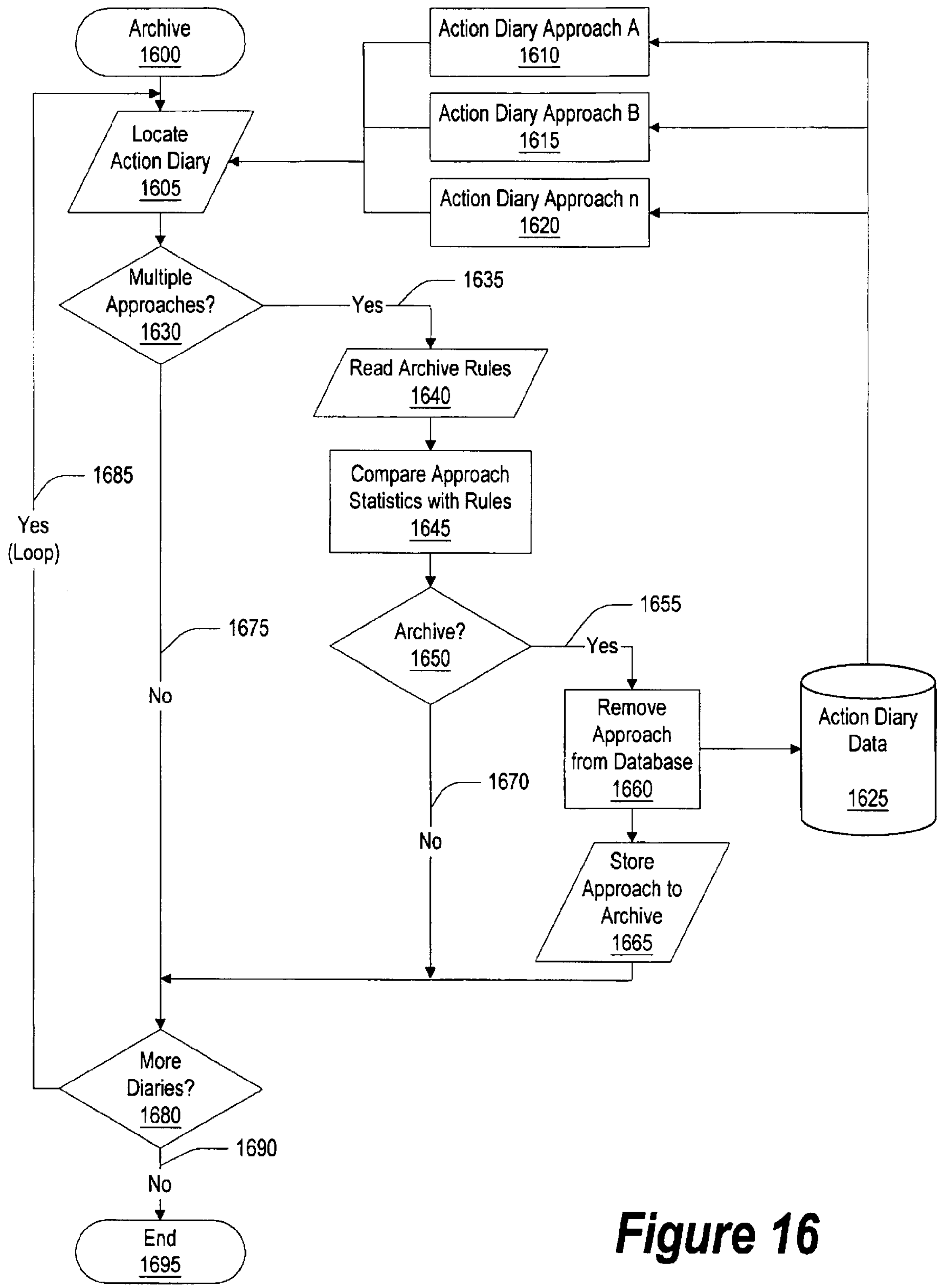
FIG. 16 is a block diagram of an information handling system capable of implementing the present invention.

FIG. 16 is a flowchart for archiving outdated action diaries based on archival rules. Processing commences at 1600 whereupon an action diary is located (input 1605) from action diary data 1625. Action diary includes one or more approaches. In the example shown, the action diary includes action diary approach 1610, action diary approach 1615, and action diary approach 1620. If multiple approaches were not identified, decision 1630 branches to "no" branch 1675 bypassing archival steps (if only one approach exists if should not be archived). If, on the other hand, multiple approaches exist for the action diary, "yes" branch 1635 is taken. Archival rules are read (input 1640) and used to analyze (step 1645) statistics corresponding with each approach. If the analysis determines that the approach should be archived, decision 1650 branches to "yes" branch 1655 whereupon the approach is removed (step 1660) from action diary data 1625 and the removed approach is stored in an archival area (output 1665) so that it might be retrieved at a later time. On the other hand, if analysis 1645 does not determine that the approach should be archived, decision 1650 branches to "no" branch 1670 bypassing the archival steps.

Decision 1680 is used to determine whether all diaries included in action diary data 1625 have been analyzed. If more diaries need to be analyzed, decision 1680 branches to "yes" branch 1685 which returns, or loops, back to locate the next action diary. On the other hand, if there are no more action diaries, "no" branch 1690 is taken whereupon processing terminates at 1695.

Figure 17:
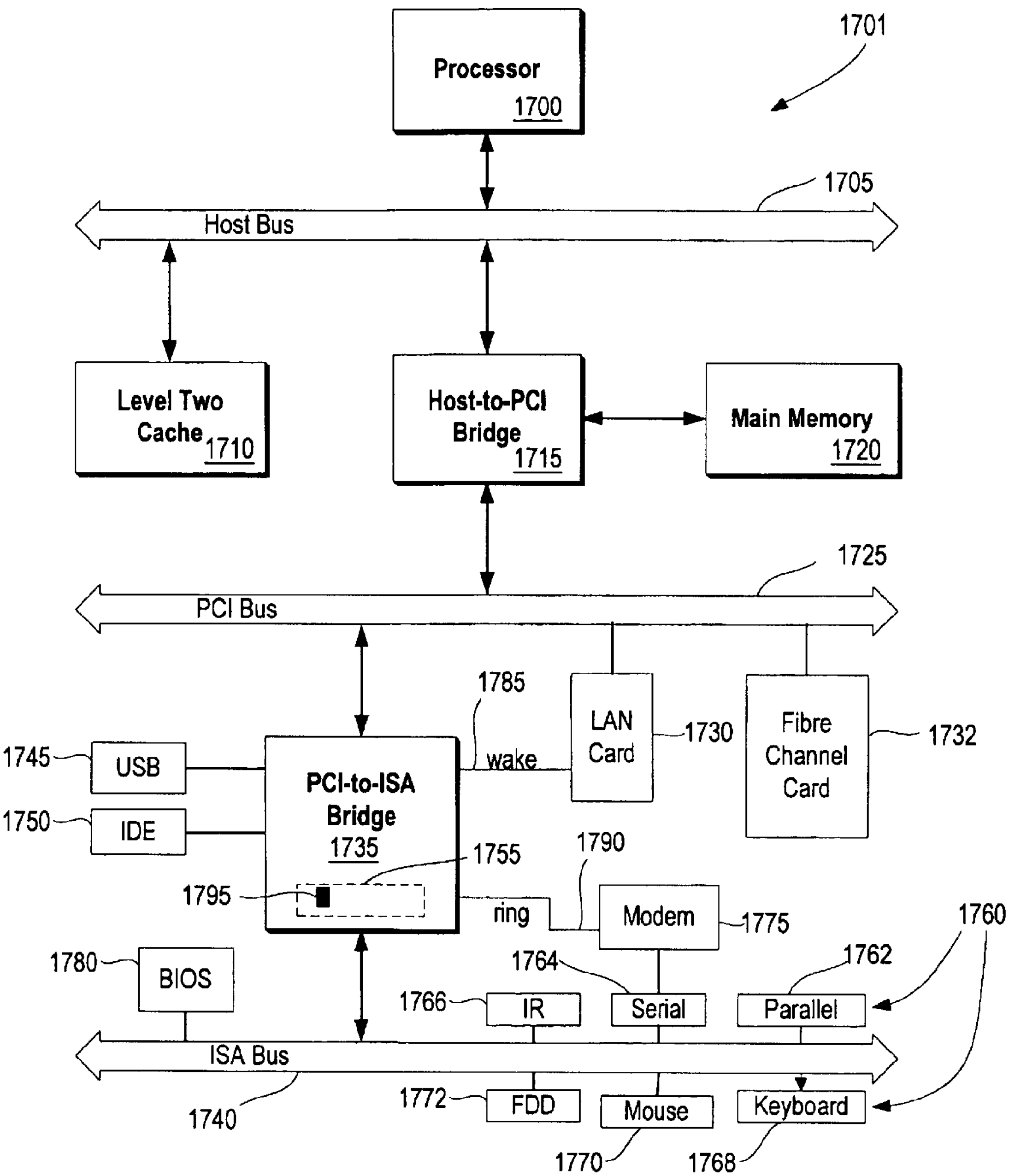
FIG. 17 is a block diagram of an information handling system capable of implementing the present invention.

FIG. 17 illustrates information handling system 1701 which is a simplified example of a computer system capable of performing the present invention. Computer system 1701 includes processor 1700 which is coupled to host bus 1705. A level two (L2) cache memory 1710 is also coupled to the host bus 1705. Host-to-PCI bridge 1715 is coupled to main memory 1720, includes cache memory and main memory control functions, and provides bus control to handle transfers among PCI bus 1725, processor 1700, L2 cache 1710, main memory 1720, and host bus 1705. PCI bus 1725 provides an interface for a variety of devices including, for example, LAN card 1730. PCI-to-ISA bridge 1735 provides bus control to handle transfers between PCI bus 1725 and ISA bus 1740, universal serial bus (USB) functionality 1745, IDE device functionality 1750, power management functionality 1755, and can include other functional elements not shown, such as a real-time clock (RTC), DMA control, interrupt support, and system management bus support. Peripheral devices and input/output (I/O) devices can be attached to various interfaces 1760 (e.g., parallel interface 1762, serial interface 1764, infrared (IR) interface 1766, keyboard interface 1768, mouse interface 1770, and fixed disk (FDD) 1772) coupled to ISA bus 1740. Alternatively, many I/O devices can be accommodated by a super I/O controller (not shown) attached to ISA bus 1740.

BIOS 1780 is coupled to ISA bus 1740, and incorporates the necessary processor executable code for a variety of low-level system functions and system boot functions. BIOS 1780 can be stored in any computer readable medium, including magnetic storage media, optical storage media, flash memory, random access memory, read only memory, and communications media conveying signals encoding the instructions (e.g., signals from a network). In order to attach computer system 1701 another computer system to copy files over a network, LAN card 1730 is coupled to PCI-to-ISA bridge 1735. Similarly, to connect computer system 1701 to an ISP to connect to the Internet using a telephone line connection, modem 1775 is connected to serial port 1764 and PCI-to-ISA Bridge 1735.

While the computer system described in FIG. 17 is capable of executing the invention described herein, this computer system is simply one example of a computer system. Those skilled in the art will appreciate that many other computer system designs are capable of performing the copying process described herein.

One of the preferred implementations of the invention is an applications, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims and to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an") the same holds true for the use in the claims of definite articles.

What is claimed is:

1. A method for coordinating efforts of a plurality of system operators, said method comprising:

capturing one or more first actions taken by a first operator in an action diary;

receiving the first actions via the action diary by a second operator;

capturing one or more comments from at least one of the operators;

storing the captured comments in the action diary;

receiving data regarding a system event, wherein the system event is an actual system event corresponding to a problem related to a network device;

searching a data store to locate the action diary, wherein the action diary corresponds to the received system event;

searching the action diary for the system event; and performing one or more actions adapted to address the problem related to the network device.

2. The method as described in claim 1 further comprising:

combining one or more second actions taken by the second operator with the first actions; and storing the combined actions in the action diary.

3. The method as described in claim 2 further comprising:

editing the combined actions, the editing resulting in a best current practice; and storing the best current practice.

4. The method as described in claim 1 further comprising:

capturing one or more additional actions executed during the performance of the one or more actions;

modifying the action diary by including the one or more additional actions; and storing the modified action diary.

5. The method as described in claim 1 further comprising:

capturing data during the performance of the one or more actions;

creating a data capture object adapted to capture the data;

modifying the action diary by including the data capture object; and storing the modified action diary.

6. The method as described in claim 1 further comprising:

displaying action diary information to a user;

receiving action diary component data from the user;

modifying at least one of the action diaries using the component information; and storing the modified action diaries.

7. The method as described in claim 1 further comprising:

capturing one or more new actions in response to the searching not resulting in an identification of at least one action diary;

associating the new actions with the received event; and creating a new action diary, the new action diary including the new action and at least one association resulting from the associating.

8. The method as described in claim 7 further comprising:

storing the new action diary.

9. The method as described in claim 7 further comprising:

capturing data during the performance of the new actions; and creating a data capture object adapted to capture the data.

10. The method as described in claim 1 further comprising:

performing one or more data capture actions in response to a successful search for the action diary.

11. The method as described in claim 10 further comprising:

identifying data within a computer system;

creating a method for automatically capturing the data; and associating the method with the action diary.

12. The method as described in claim 11 further comprising:

creating a storage method for storing the captured data; and associating the storage method with one or more action diaries.

13. The method as described in claim 11, wherein the identifying, creating, and associating are performed in response to the searching not resulting in an identification of at least one action diary.

14. The method as described in claim 13 further comprising:

creating a new action diary, the new action diary including the method and at least one association resulting from the associating.

15. The method as described in claim 11 further comprising:

creating a new action diary; and storing the new action diary.

16. The method as described in claim 10 further comprising:

performing one or more actions, wherein the one or more actions are identified by the action diary.

17. The method as described in claim 1 further comprising:

locating one or more solving approaches within the action diary;

comparing the one or more event solving approaches with one or more archival rules; and archiving one or more of the one or more event solving approaches in response to the comparing.

18. The method as described in claim 17 further comprising:

removing the approaches from an action diary data store.

19. The method as described in claim 18 further comprising:

storing the approaches in an alternate data store.

20. The method as described in claim 17 wherein the comparing further includes comparing approach statistics associated with the approaches with the one or more archival rules.

21. The method as described in claim 1 further comprising:

determining whether multiple approaches exist within the action diary;

wherein the archiving is performed in response to determining that multiple approaches exist.

22. The method as described in claim 1 further comprising:

identifying a plurality of action diaries within an action diary data store; and performing the locating, comparing, the archiving for each of the identified action diaries.

23. The method as described in claim 1 further comprising:

manually selecting one or more approaches included in an action diary; and archiving the manually selected approaches.

24. The method as described in claim 1 further comprising:

grouping action diaries, the grouping including:

including one or more objects in a first approach group, wherein the first approach group includes a first approach for handling a system event; and storing the approach group in the action diary.

25. The method as described in claim 24 further comprising:

including one or more objects in a second approach group, wherein the second approach group includes a second approach for handling the system event.

26. The method as described in claim 24 further comprising:

displaying a first graphic related to the approach group.

27. The method as described in claim 26 wherein the graphic indicates a position of the approach group within a lifecycle.

28. The method as described in claim 24 wherein the first approach group includes at least one of group properties, action objects, text notes objects, and parameter objects.

29. The method as described in claim 28 wherein the text notes objects includes one or more annotations, the annotations describing handling the system event.

30. The method as described in claim 24 further comprising:

displaying one or more objects included in the approach group;

selecting one of the objects, the selecting performed by an operator using a selected device; and modifying the selected object in response to the selecting.

31. A method for coordinating efforts of a plurality of system operators, said method comprising:

capturing one or more first actions taken by a first operator in an action diary;

receiving the first actions via the action diary by a second operator;

capturing one or more comments from at least one of the operators;

storing the captured comments in the action diary;

receiving data regarding a system event;

searching a data store to locate the action diary, wherein the action diary corresponds to the received system event; and invoking a chat window on a first computer by the first operator and on a second computer operated by the second operator, wherein the chat window includes displaying interactive information between the first and second operators.

32. The method as described as claim 31 wherein the invoking automatically occurs when the first and second operators access the action diary.

33. An information handling system for coordinating operator efforts, said information handling system comprising:

one or more processing units;

a tool for coordinating operator efforts, the operator efforts coordination tool including:

means for capturing one or more first actions taken by a first operator in an action diary;

means for receiving the first actions via the action diary by a second operator;

means for capturing one or more comments from at least one of the operators;

means for storing the captured comments in the action diary;

means for receiving data regarding a system event, wherein the system event is an actual system event corresponding to a problem related to a network device;

means for searching a data store to locate the action diary, wherein the action diary corresponds to the received system event;

means for searching the action diary for the system event; and means for performing one or more actions adapted to address the problem related to the network device.

34. The information handling system as described in claim 33 further comprising:

means for combining one or more second actions taken by the second operator with the first actions; and means for storing the combined actions in the action diary.

35. The information handling system as described in claim 34 further comprising:

means for editing the combined actions, the editing resulting in a best current practice; and means for storing the best current practice.

36. The information handling system as described in claim 33 further comprising:

means for invoking a chart window on a first computer operated by the first operator and on a second computer operated by the second operator, wherein the chat window includes means for displaying interactive information between the first and second operators.

37. The information handling system as described in claim 36 wherein the means for invoking automatically occurs when the first and second operators access the action diary.

38. A computer program product for coordinating efforts of a plurality of system operators, said computer program product comprising:

means for capturing one or more first actions taken by a first operator in an action diary;

means for receiving the first actions via the action diary by a second operator;

means for capturing one or more comments from at lest one of the operators;

means for storing the captured comments in the action diary;

means for receiving data regarding a system event, wherein the system event is an actual system event corresponding to a problem related to a network device;

means for searching a data store to locate the action diary, wherein the action diary corresponds to the received event;

means for searching the action diary for the system event; and means for performing one or more actions adapted to address the problem related to the network device.

39. The computer program product as described in claim 38 further comprising:

means for combining one or more second actions taken by the second operator with the first actions; and means for storing the combined actions in the action diary.

40. The computer program product as described in claim 39 further comprising:

means for editing the combined actions, the editing resulting in a best current practice; and means for storing the best current practice.

41. The computer program product as described in claim 38 further comprising:

means for invoking a chat window on a first computer operated by the first operator and on a second computer operated by the second operator, wherein the chart window includes means for displaying interactive information between the first and second operators.

* * * * *

UNITED STATES PATENT AND TRADEMARK OFFICE

CERTIFICATE OF CORRECTION

PATENT NO. : 6,944,866 B1
DATED : September 13, 2005
INVENTOR(S) : MacPhail et al.

It is certified that error appears in the above-identified patent and that said Letters Patent is hereby corrected as shown below:

Title page,
Item [75], Inventors, insert -- Richard Stephen Szulewski, Wake Forest, NC --.

Column 5,
Lines 29-30, delete "FIG. 15 is a flowchart for archiving outdated action diaries based on archival rules; and" and insert -- FIG. 15 is a flowchart for creating a new action diary using other system components and objects --.
Lines 31-32, delete "FIG. 16 is a block diagram of an information handling system capable of imlementing the present invention." and insert -- FIG. 16 is a flowchart for archiving outdated action diaries based on archival rules; and --.

Column 9,
Line 36, delete "improved" and insert -- improves --.

Column 15,
Line 6, delete "applications" and insert -- application --.
Line 28, delete "and" and insert -- are --.

Signed and Sealed this

Twenty-first Day of March, 2006

JON W. DUDAS
*Director of the United States Patent and Trademark Office*